United States Patent
Fujiwara et al.

(10) Patent No.: US 7,284,134 B2
(45) Date of Patent: Oct. 16, 2007

(54) ID INSTALLABLE LSI, SECRET KEY INSTALLATION METHOD, LSI TEST METHOD, AND LSI DEVELOPMENT METHOD

(75) Inventors: Makoto Fujiwara, Kyoto (JP); Akira Motohara, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 848 days.

(21) Appl. No.: 10/231,376

(22) Filed: Aug. 30, 2002

(65) Prior Publication Data

US 2003/0088785 A1    May 8, 2003

(51) Int. Cl.
*G06F 11/30* (2006.01)

(52) U.S. Cl. ............... 713/189; 713/168; 713/191; 713/194; 380/44; 380/45; 380/46; 714/738; 324/763

(58) Field of Classification Search ............ 713/189, 713/191, 168, 194; 380/4, 44–45, 46, 49; 371/25; 324/763; 365/200; 370/25; 714/738
See application file for complete search history.

(56) References Cited

U.S. PATENT DOCUMENTS

| 4,450,560 | A | * | 5/1984 | Conner | 714/736 |
| 4,904,883 | A | * | 2/1990 | Iino et al. | 327/198 |
| 5,377,264 | A | * | 12/1994 | Lee et al. | 713/189 |
| 5,446,395 | A | * | 8/1995 | Goto | 324/763 |
| 5,828,753 | A | * | 10/1998 | Davis | 713/189 |
| 5,892,900 | A |   | 4/1999 | Ginter et al. | |
| 5,930,599 | A | * | 7/1999 | Fujimoto et al. | 438/113 |
| 2001/0015919 | A1 | * | 8/2001 | Kean | 365/200 |

FOREIGN PATENT DOCUMENTS

| JP | 63-172348 | 7/1988 |
| JP | 63-292638 | 11/1988 |
| JP | 05-012130 | 1/1993 |
| JP | 06-035805 | 2/1994 |
| JP | 09-045100 | 2/1997 |
| JP | 2000-068458 | 3/2000 |
| JP | 2000-151577 | 5/2000 |
| JP | 2000-163547 | 6/2000 |
| JP | 2000-223661 | 8/2000 |

* cited by examiner

*Primary Examiner*—Kim Vu
*Assistant Examiner*—Baotran N. To
(74) *Attorney, Agent, or Firm*—McDermott Will & Emery LLP

(57) ABSTRACT

In an LSI, a decoding section decodes an ID signal received externally and outputs the decoded signal. A fuse circuit writes the value represented by the decoded signal therein when an operation setting signal is active, and holds the written value when the operation setting signal is inactive. An ID RAM stores the value held in the fuse circuit as the ID. This enables installation of IDs of various values in LSIs only by changing the value of the ID signal.

5 Claims, 19 Drawing Sheets

During write operation

After write operation

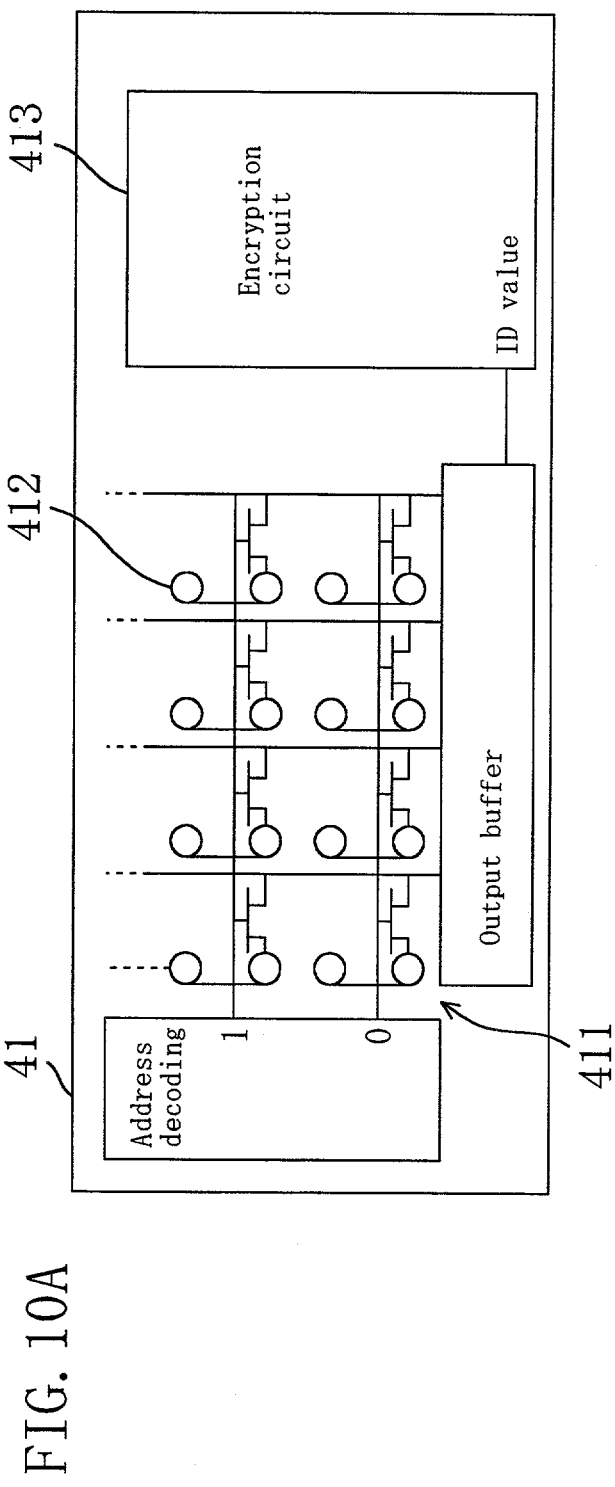
FIG. 10A
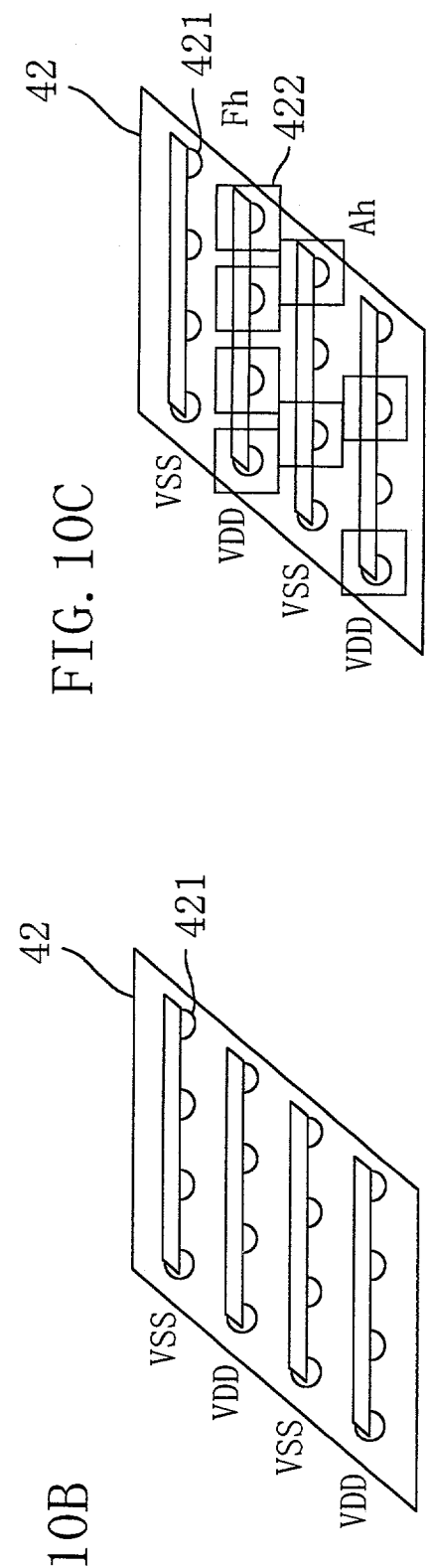
FIG. 10B
FIG. 10C

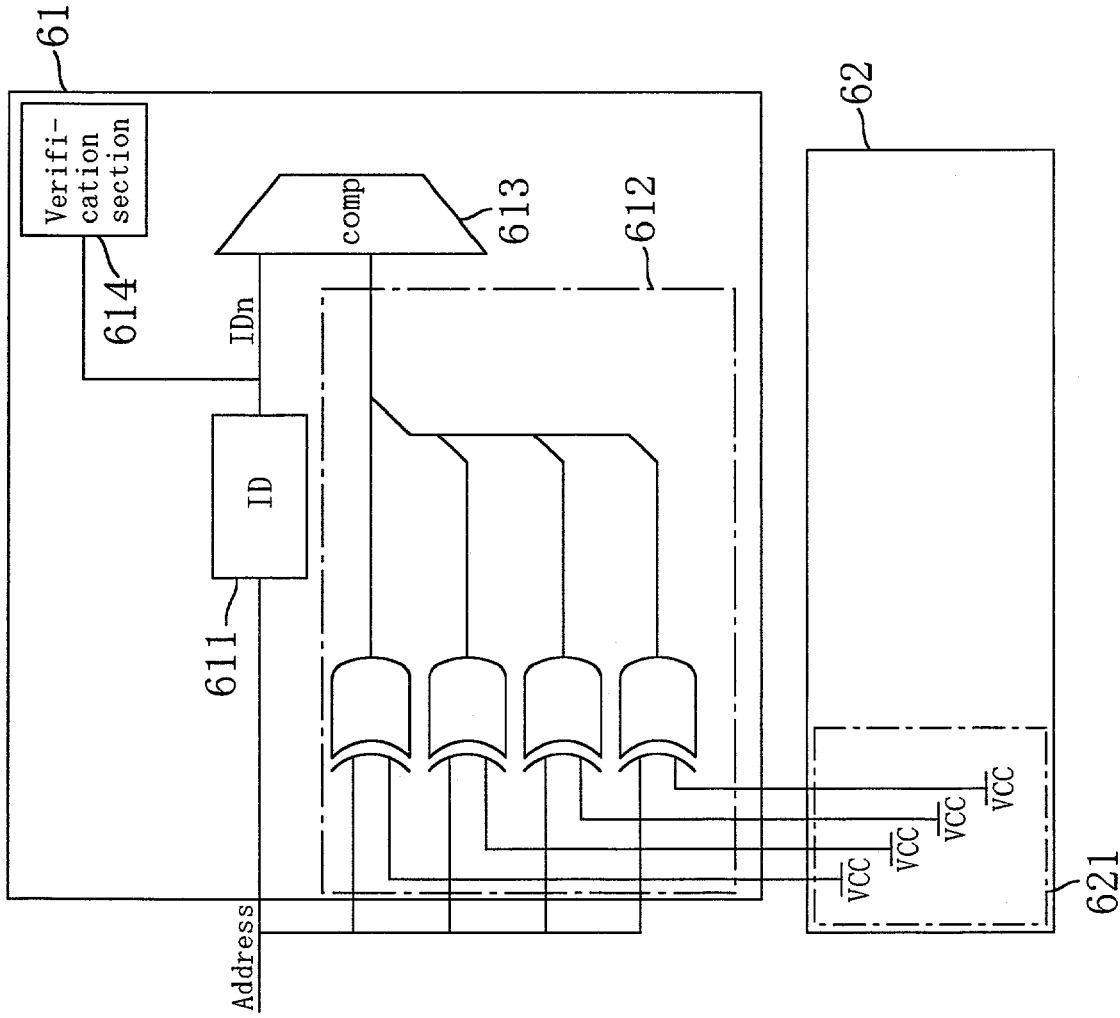

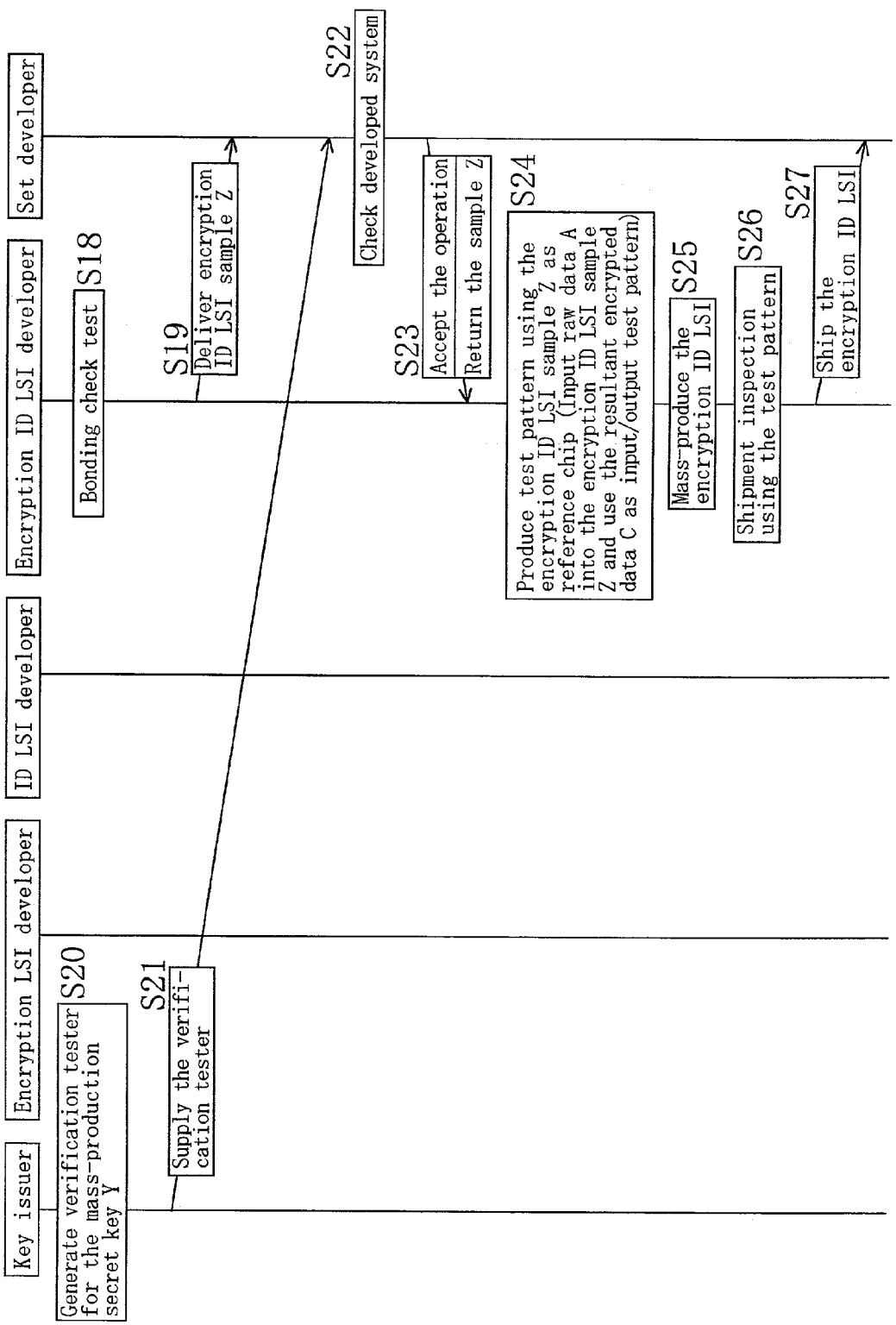

ID INSTALLABLE LSI, SECRET KEY INSTALLATION METHOD, LSI TEST METHOD, AND LSI DEVELOPMENT METHOD

BACKGROUND OF THE INVENTION

The present invention relates to a technology related to development, fabrication and test of LSIs in which an ID or a secret key has been installed.

In general CMOS LSIs, it is difficult to install different keys. Because, key is implemented in General CMOS LSIs by hard-wired logic or ROM. So, key is not able to changing. A key may be loaded from an external ROM. In this case, however, the key may be analyzed inside a system. Also, a person other than the key administrator, such as a network distributor, an LSI designer and a set designer, may possibly come to know the key. In addition, it is difficult to write keys with different values by mass-production technology. The package may be unsealed for chip analysis. Moreover, there is no way to verify whether or not the key has been installed correctly. That is, testing of internal keys is difficult.

SUMMARY OF THE INVENTION

An object of the present invention is providing LSIs permitting easy installation of various IDs.

Another object of the present invention is providing a secret key installation method in which the concealment of the secret key in an LSI enhances or the setting of the value of the secret key to be installed is facilitated.

Yet another object of the present invention is providing an LSI test method enabling testing of the installed ID value without increase of the LSI circuit count.

Yet another object of the present invention is providing an LSI development method in which a sufficiently high degree of concealment of the secret key is ensured in the development process.

Specifically, the present invention is directed to an ID installable LSI including: a decoding section for receiving an ID signal representing the ID from outside the LSI, decoding the ID signal, and outputting the decoded signal; a value holding circuit for receiving the decoded signal, writing the value represented by the decoded signal therein when an operation setting signal is active, and holding the written value when the operation setting signal is inactive; and an ID memory part for storing the value held in the value holding circuit as the ID.

According to the invention described above, IDs of various values can be installed in LSIs only by changing the value of the ID signal. This enables mass production of ID-installed LSIs.

In another aspect, the present invention is directed to a method for installing a secret key in an LSI, including the step of bonding a second LSI to a first LSI, wherein the first LSI comprises: a memory part for storing a first secret key; first and second external input terminals; a selector having an input for receiving the first secret key and the other input connected with the first external input terminal, the selector also having a selection signal input connected with the second external input terminal; and a processing circuit using the output of the selector as a secret key, the second LSI includes: a memory part for storing a second secret key; a first external output terminal from which the second secret key is output; and a second external output terminal from which a selection signal is output, the selection signal being set so that the selector of the first LSI selects and outputs the other input, and the step of bonding comprises bonding the second LSI to the first LSI so that the first and second external output terminals of the second LSI are connected to the first and second external input terminals of the first LSI, respectively.

According to the invention described above, the second LSI with the second secret key installed therein is bonded to the first LSI. This makes it extremely difficult to monitor the second secret key outside the LSI, and thus improves the concealment of the second secret key.

Alternatively, the present invention is directed to a method for installing a secret key in an LSI, including the step of bonding a second LSI to a first LSI, wherein the first LSI includes: first, second and third external input terminals; a memory part for storing a first secret key and a first random number of seed and outputting either one of the first secret key and the first random number of seed according to a signal input at the first external input terminal; a random number generation circuit for receiving the output of the memory part and a signal input at the second external input terminal; a selector for receiving the output of the memory part and the output of the random number generation circuit as inputs and selecting and outputting either one of the inputs according to a signal input at the third external input terminal; and a processing circuit using the output of the selector as the secret key, the second LSI includes: a memory part for storing a second random number of seed; a first external output terminal from which a selection signal is output, the selection signal being set so that the memory part of the first LSI outputs the first random number of seed; a second external output terminal from which the second random number of seed is output; and a third external output terminal from which a selection signal is output, the selection signal being set so that the selector of the first LSI selects and outputs the output of the random number generation circuit, and the step of bonding includes bonding the second LSI to the first LSI so that the first, second and third external output terminals of the second LSI are connected to the first, second and third external input terminals of the first LSI, respectively.

According to the invention described above, the second LSI with the second random number of seed installed therein is bonded to the first LSI. This makes it extremely difficult to monitor the secret key generated based on the first and second random number of seed, and thus improves the concealment of the secret key.

Alternatively, the present invention is directed to a method for installing a secret key in an LSI, including: a first step of determining the position to be bumped in a pad portion of a second LSI according to the ID provided for a first LSI; a second step of bumping the position in the second LSI determined in the first step; and a third step of bonding the bumped second LSI to the first LSI.

According to the invention described above, the ID value to be supplied to the first LSI can be changed only by changing the position to be bumped in the second LSI.

Alternatively, the present invention is directed to a method for installing a secret key in an LSI, including: a first step of selecting one wiring LSI among a plurality of types of wiring LSIs; and a second step of bonding a first LSI and a second LSI to the wiring LSI selected in the first step, wherein the wiring LSI includes one external input terminal and a plurality of external output terminals, one of the plurality of external output terminals determined according to the type of the wiring LSI being connected with the external input terminal, the first LSI including: a plurality of random number input terminals; and a random number generation circuit connected with the random number input terminals via different input lines for generating a random number to be used as a secret key based on random number data input via one of the input lines with a type of logic unique to the used input line, the second LSI includes: a memory part for storing random number data; and a random number output terminal for outputting the random number data stored in the memory part, and the second step comprises bonding the first LSI to the selected wiring LSI so that the random number input terminals of the first LSI are connected to the corresponding external output terminals of the wiring LSI, and bonding the second LSI to the wiring LSI so that the random number output terminal of the second LSI is connected to the external input terminal of the wiring LSI.

According to the invention described above, the input line via which the random number data is input into the random number generation circuit can be changed by changing the type of the wiring LSI. This enables generation of mass-production secret keys with different types of logic.

According to yet another aspect, the present invention is directed to an LSI test method including the step of: testing an LSI with a tester LSI, the LSI having a memory part from which an ID value is output according to an address supplied, wherein the LSI comprises a first test circuit, the tester LSI comprises a second test circuit, the first and second test circuits, in the state of being connected with each other, outputting the same value as that output from the memory part when receiving the same address as that supplied to the memory part, and the step of testing comprises connecting the second test circuit of the tester LSI to the first test circuit of the LSI and comparing the output of the connected first and second test circuits with the output of the memory part.

According to the invention described above, the installed ID value can be tested without increase of the LSI circuit count.

According to yet another aspect, the present invention is directed to an LSI development method including the steps of: a key publisher generating a development secret key and a random number of seed and supplying the development secret key and the random number of seed to a first developer; the first developer developing a first LSI using the development secret key and the random number of seed; the key publisher generating a random number and supplying the random number to a second developer; the second developer developing a second LSI using the random number; the first developer supplying the developed first LSI to a producer; the second developer supplying the developed second LSI to the producer; the key publisher determining the position in which the first LSI and the second LSI are bonded together and supplying the position to the producer; and the producer bonding the first LSI and the second LSI together according to the position of bonding supplied from the key publisher.

BRIEF DESCRIPTION OF THE DRAWINGS

FIGS. 10(*a*) to 10(*c*) illustrate a secret key installation method of the fourth embodiment of the present invention.

FIG. 14 illustrates an LSI test method of the sixth embodiment of the present invention.

FIG. 19 is a continuation of the flowchart of the development method of the encryption ID LSI shown in FIG. 17.

DESCRIPTION OF THE PREFERRED EMBODIMENTS

Hereinafter, embodiments of the present invention will be described with reference to the accompanying drawings.

First Embodiment

Figure 1:
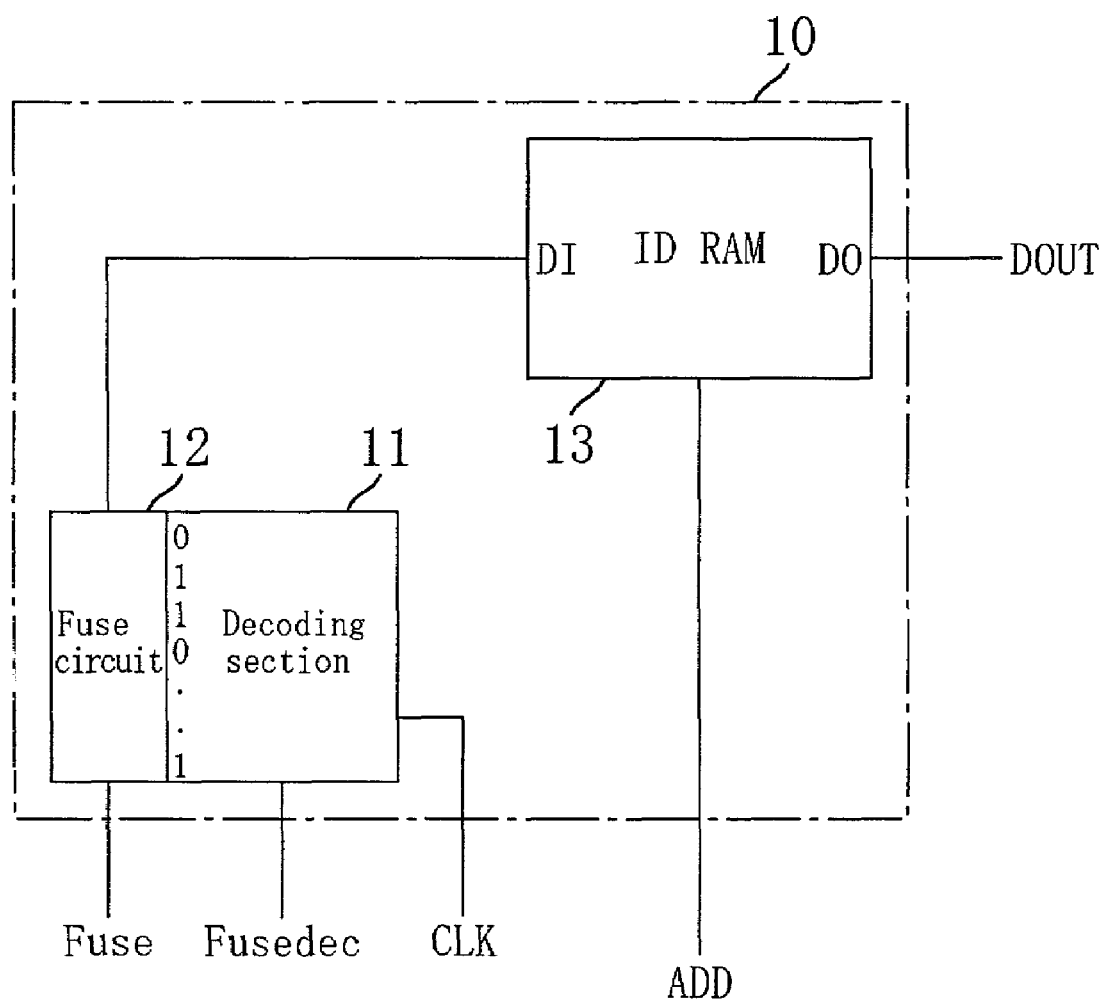
FIG. 1 is a block diagram of an ID installable LSI of the first embodiment of the present invention.

FIG. 1 is a block diagram of an ID installable LSI of the first embodiment of the present invention. The LSI 10 shown in FIG. 1 is configured to be able to receive an ID as a secret key in its fabrication process. In other words, signals Fuse and Fusedec are supplied to the LSI 10 with a tester for shipment inspection, for example. In this way, such LSIs 10 with IDs of different values can be easily mass-produced.

A decoding section 11 receives the ID signal Fusedec representing an ID externally and decodes the ID signal Fusedec. A fuse circuit 12, providing as a value holding circuit, receives the decoded signal output from the decoding section 11 and writes the value represented by the decoded signal therein when an operation setting signal Fuse is active. The written value is held when the operation setting signal Fuse is inactive. An ID RAM 13, providing as an ID memory part, stores the value held in the fuse circuit 12 as the ID.

Figure 2:
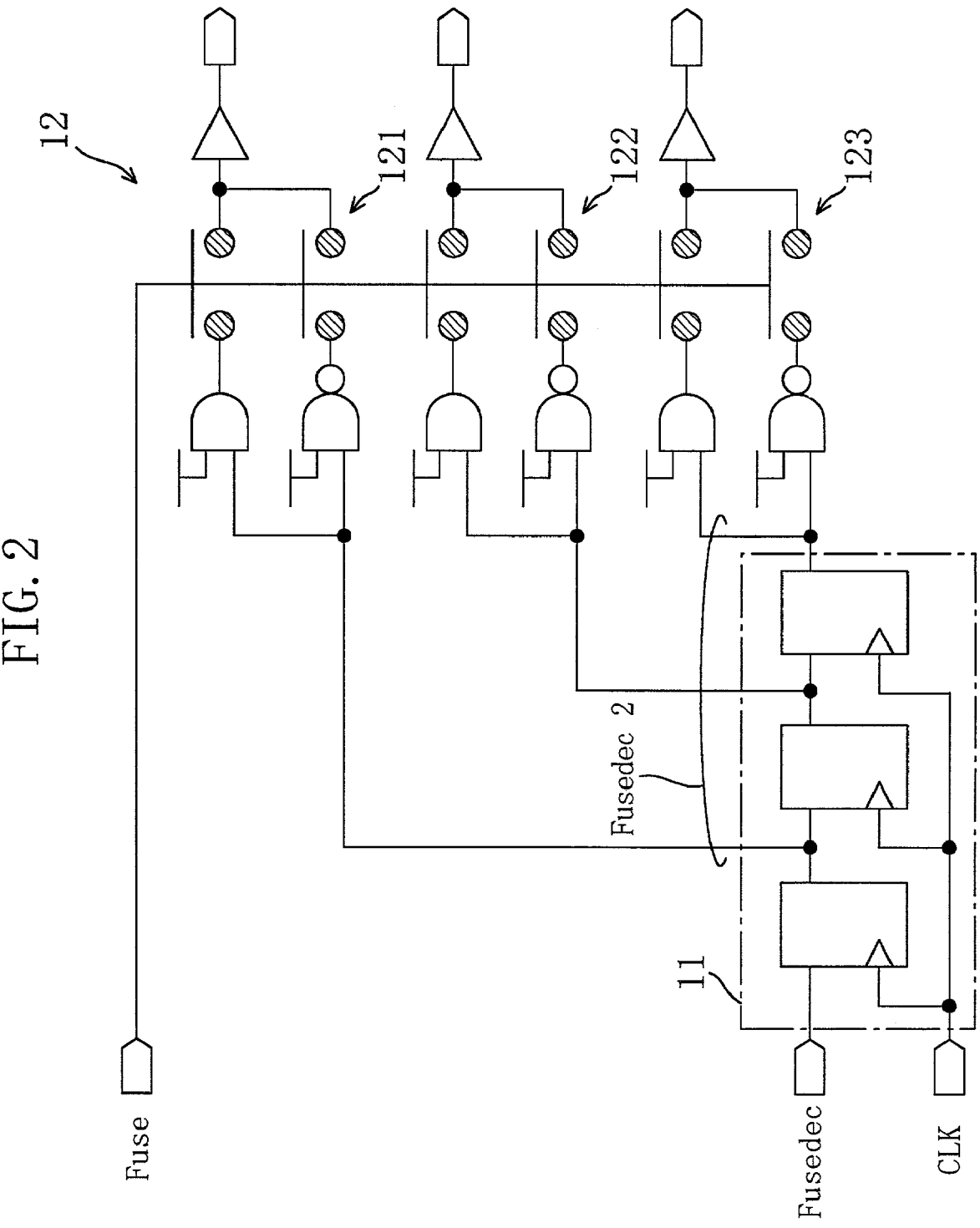
FIG. 2 illustrates a specific example of configuration of a decoding section and a fuse circuit.

FIG. 2 illustrates a specific example of configuration of the decoding section 11 and the fuse circuit 12 shown in FIG. 1. The decoding section 11 receives the ID signal Fusedec and a clock CLK and outputs a 3-bit decoded signal Fusedec2. The fuse circuit 12 includes three fuse pairs 121, 122 and 123 made of nonvolatile elements, to receive and hold the 3-bit values of the decoded signal Fusedec2.

Figure 3:
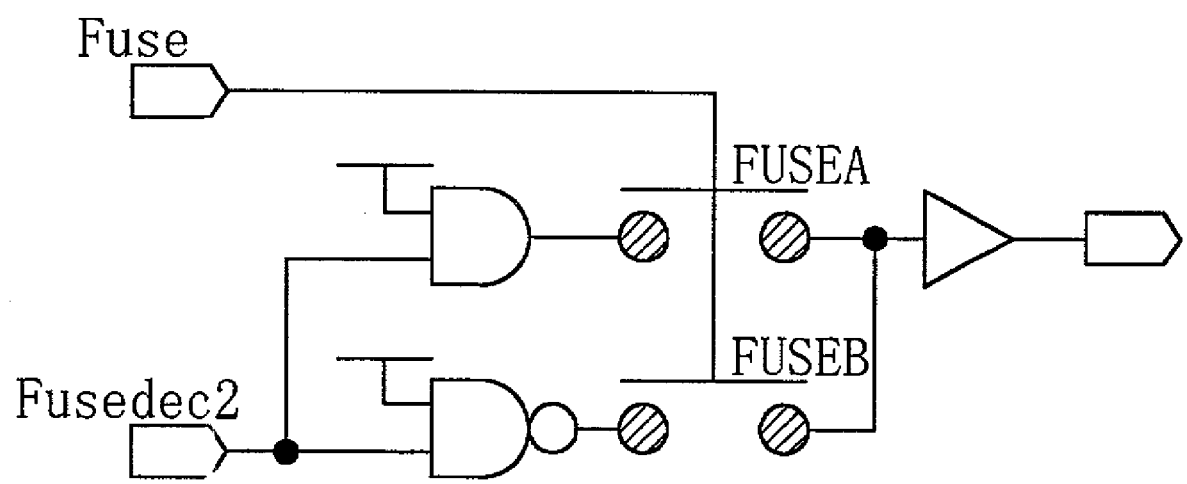
FIG. 3 is a view of a constituent of the fuse circuit.

FIG. 3 illustrates one constituent of the fuse circuit 12 shown in FIG. 2, which corresponds to 1-bit value and includes two fuses FUSEA and FUSEB.

Figure 4A:
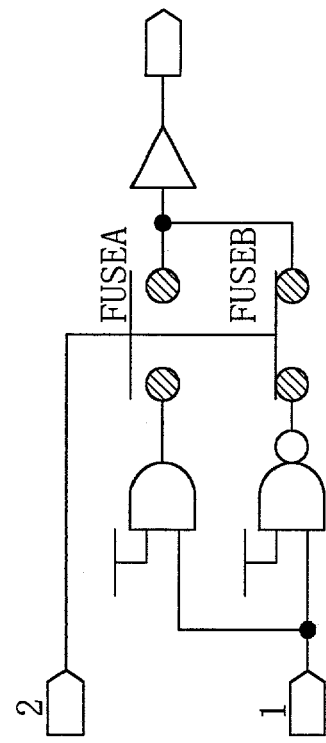
FIG. 4 illustrates operations of the constituent of the fuse circuit.
Figure 4B:
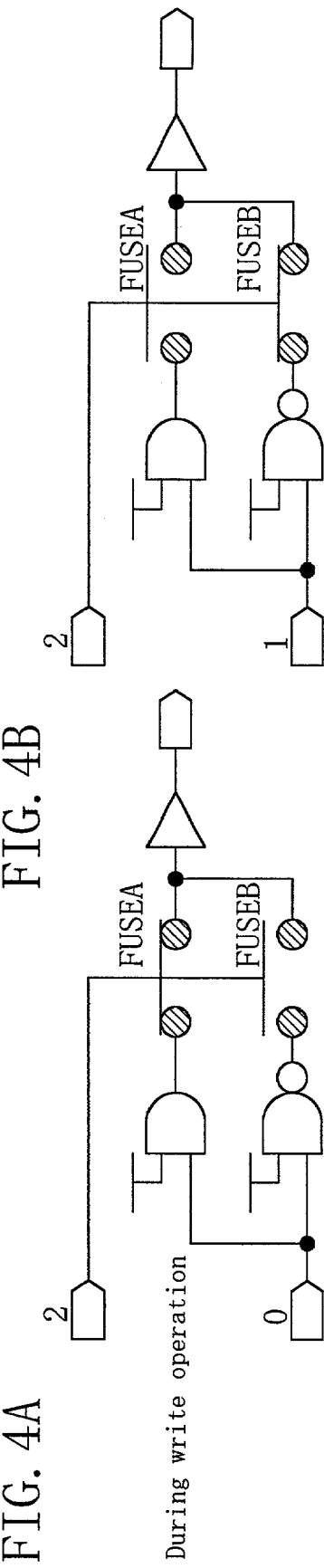
Figure 4C:
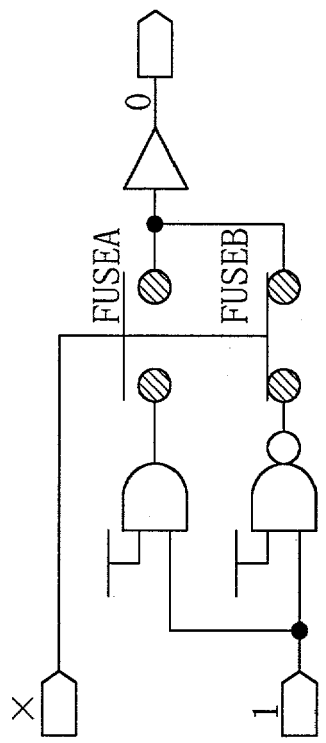
Figure 4D:
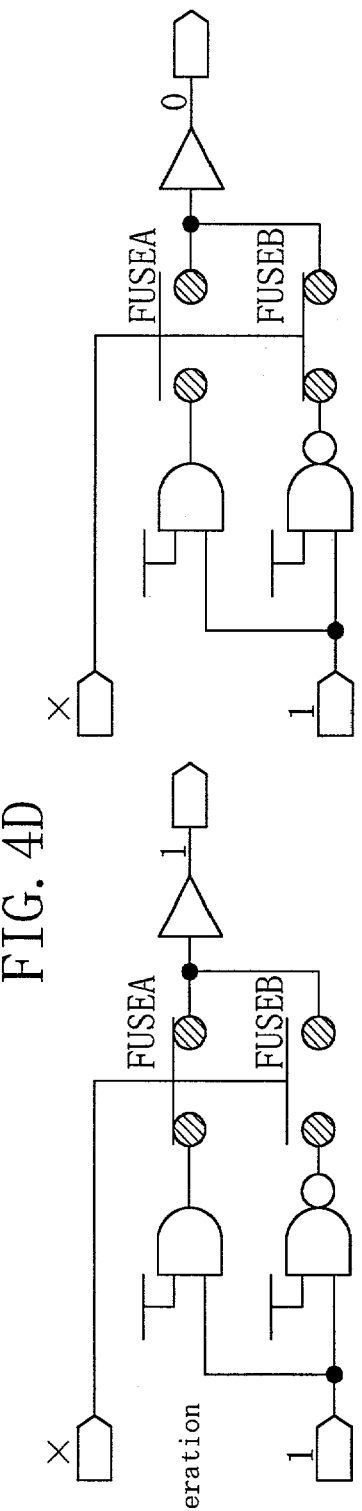

The operation of the constituent of the fuse circuit 12 shown in FIG. 3 will be described with reference to FIG. 4. First, as shown in FIGS. 4(a) and (b), during write operation, the operation setting signal Fuse is set at "2" level (active). Under this setting, when the decoded signal Fusedec2 is "0", the fuse FUSEA is turned to the connected state (a), and when the decoded signal Fusedec2 is "1", FUSEB is turned to the connected state (b). After the write operation, as shown in FIGS. 4(c) and (d), the operation setting signal Fuse is set at "X" level. Under this setting, the value "1" is held when the fuse FUSEA is in the connected state (c), and the value "0" is held when the fuse FUSEB is in the connected state (d), irrespective of the value of the decoded signal Fusedec2. The "2" level may be 5V, the "1" level may be 3V, and the "X" level may be 0 or 3V, for example.

Figure 5:
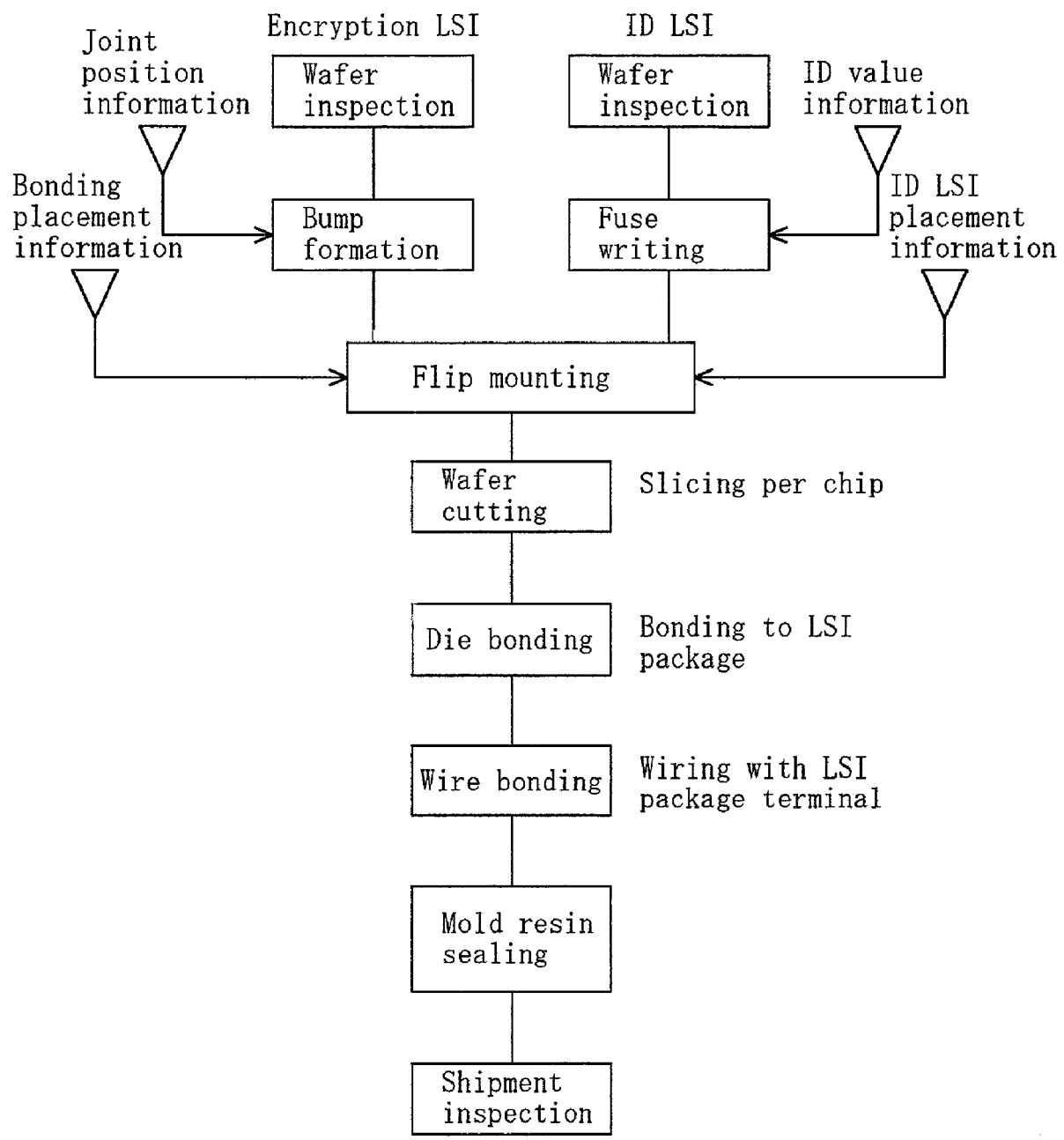
FIG. 5 is a flowchart of a fabrication process of an encryption LSI using the ID installable LSI.

With the configuration described above, an ID of a different value can be installed in the LSI 10 only by changing the value of the ID signal Fusedec, and this enables mass production of LSIs in which different ID values have been installed. After the writing of the ID value and before shipment of the product, the terminal for the signal Fusedec is fixed at "1" in an LSI package, or the signal Fusedec itself is fixed at "1" with a fuse, so as to ensure that no change of the ID value is allowed externally after shipment of the product. FIG. 5 shows an example of a flow of the fabrication process of an encryption LSI using such an ID installable LSI.

Figure 6:
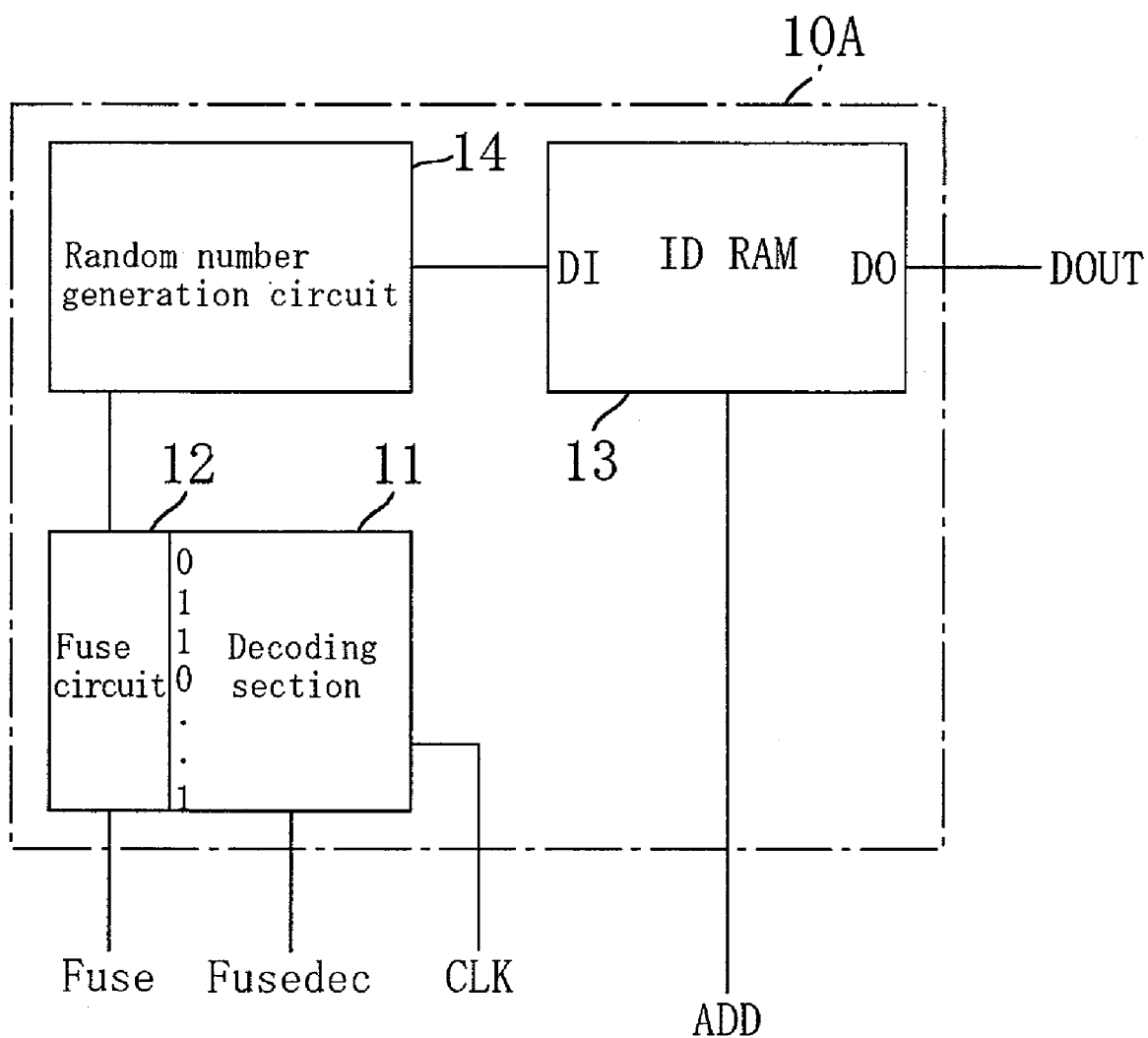
FIG. 6 illustrates an example of an LSI in which a random number generation circuit is added to the configuration of FIG. 1.

FIG. 6 illustrates an example of an LSI in which a random number generation circuit 14 is provided in addition to the configuration of FIG. 1. In the LSI 10A shown in FIG. 6, the random number generation circuit 14 receives the value held in the fuse circuit 12 and generates a random number based on the received value. The ID RAM 13 stores the random number generated by the random number generation circuit 14 as the ID, in place of the value held in the fuse circuit 12.

Any value holding circuit other than the fuse circuit 12 described above may be used as long as the circuit can fix a value and the setting of the fixed value can be made in the fabrication process. The fuse circuit 12 may be a FPGA, a flash, a mask ROM or a fuse circuit involving trimming of a wiring layer with a laser ray. A register, for example, may be used in place of the ID RAM 13.

Second Embodiment

FIG. 7 illustrates a secret key installation method of the second embodiment of the present invention. In this embodiment, as shown in FIG. 7, an ID LSI 22 as the second LSI is bonded to an encryption LSI 21 as the first LSI, to thereby install a secret key for mass production stored in the ID LSI 22 in the encryption LSI 21.

Figure 7A:
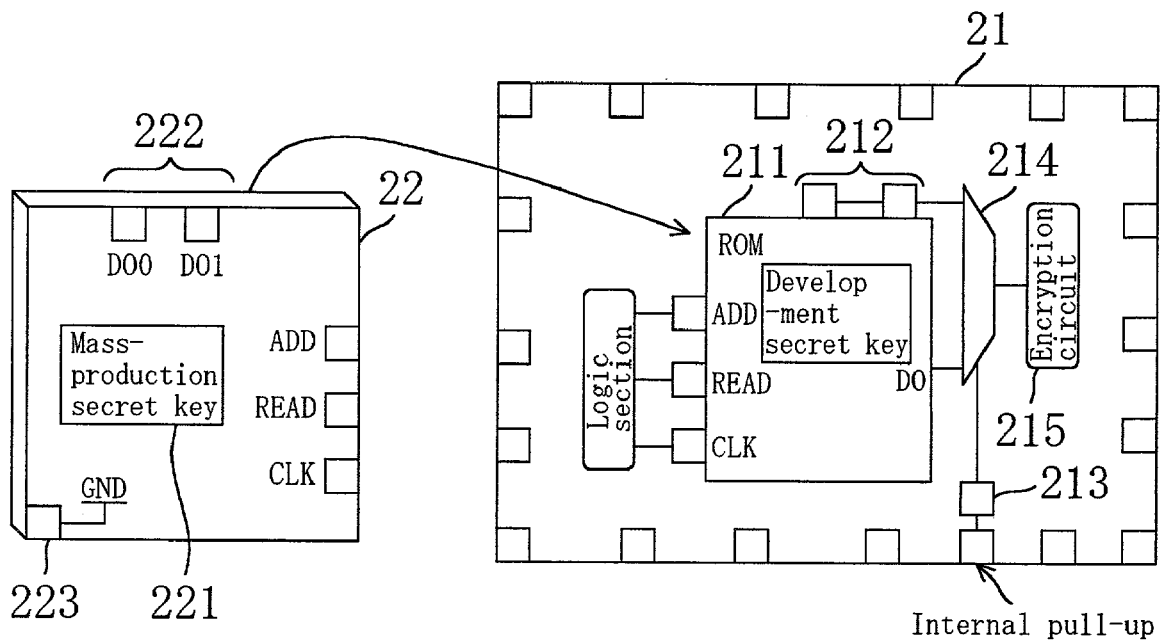
FIG. 7 illustrates a secret key installation method of the second embodiment of the present invention.

As shown in FIG. 7(a), the encryption LSI 21 includes a ROM 211 providing as a memory part storing a secret key for development as the first secret key, pads 212 and 213 as the first and second external input terminals, a selector 214, and an circuit 215 for encryption as a processing circuit using the output of the selector 214 as the secret key. One input of the selector 214 receives the development secret key stored in the ROM 211, and the other input thereof is connected with the pads 212. The selector 214 is also connected with the pad 213. The selector 214 selects and outputs the development secret key stored in the ROM 211 when a selection signal received is "H", and selects and outputs a signal input at the pads 212 when the selection signal is "L". In the encryption LSI 21, the pad 213 is in the internally pulled-up state, to thereby allow the development secret key to be input into the encryption circuit 215 via the selector 214.

The ID LSI 22 includes a memory part 221 storing a secret key for mass production as the second secret key, pads 222 as the first external output terminal from which the mass-production secret key is output, and a pad 223 as the second external output terminal connected to the ground GND.

Figure 7B:
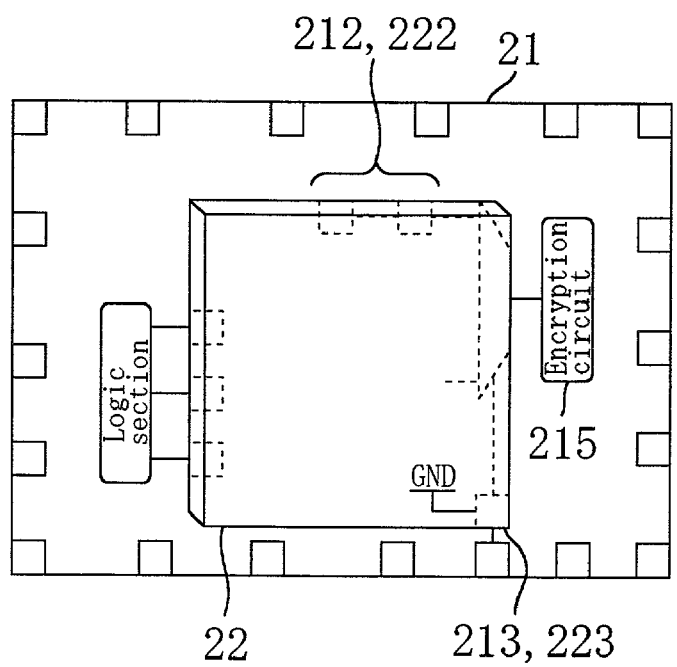

As shown in FIG. 7(b), the ID LSI 22 is bonded to the encryption LSI 21 so that the pads 222 and 223 of the ID LSI 22 are connected to the pads 212 and 213 of the encryption LSI 21, respectively. As a result, the input terminal of the selector 214 for receiving the selection signal is connected to the ground GND via the pad 213 and the pad 223 of the ID LSI 22. By this connection, the selector 214 receives "L" as the selection signal, to thereby allow the mass-production secret key installed in the ID LSI 22 to be input into the encryption circuit 215 via the selector 214.

In this embodiment, the ID LSI 22 in which the mass-production secret key has been installed is bonded to the encryption LSI 21. This makes it extremely difficult to monitor the mass-production secret key from outside the LSI, and thus improves the concealment of the mass-production secret key.

Third Embodiment

Figure 8:
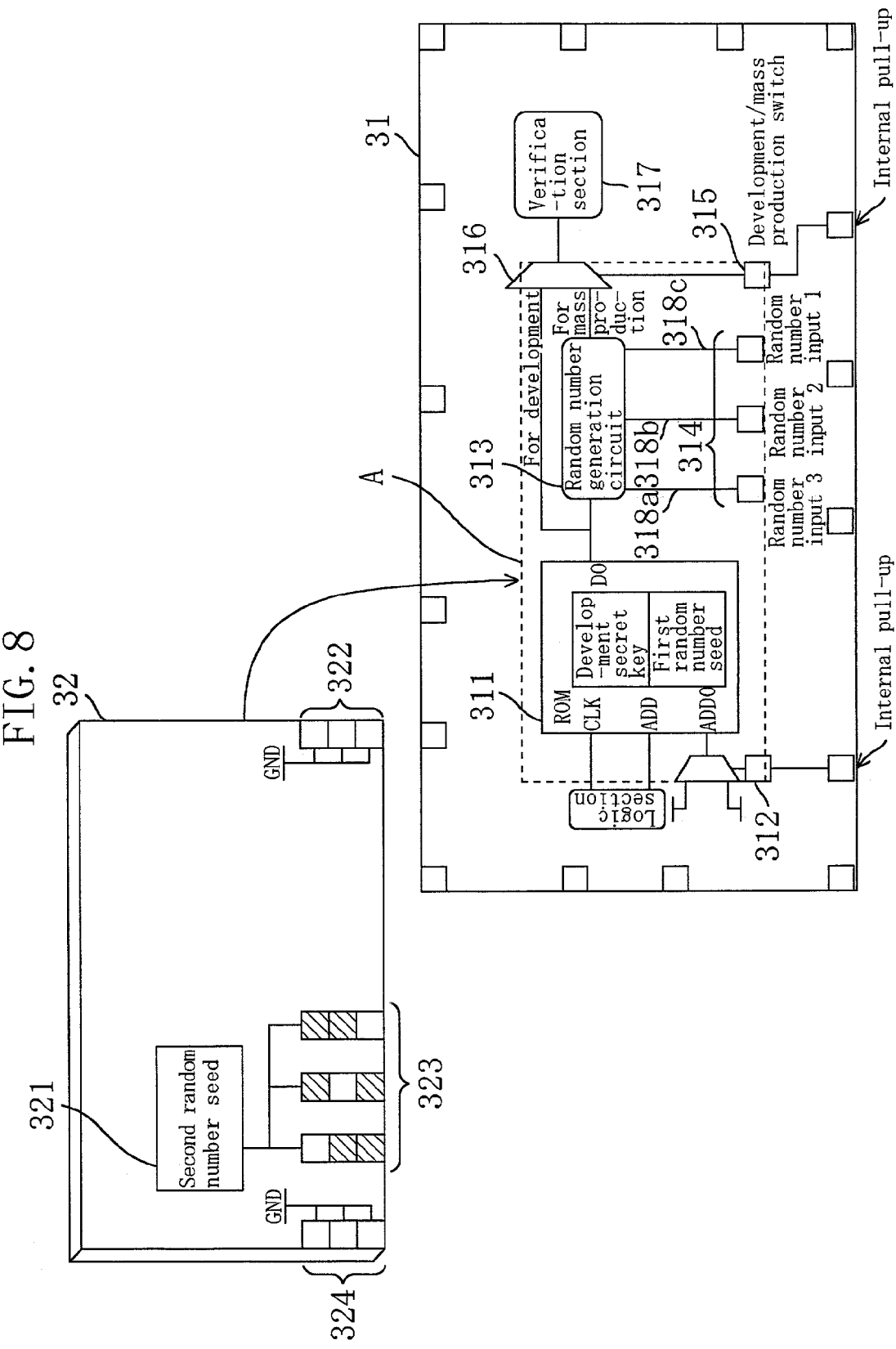
FIG. 8 illustrates a secret key installation method of the third embodiment of the present invention.

FIG. 8 illustrates a secret key installation method of the third embodiment of the present invention. In FIG. 8, a first random number of seed for generation of a mass-production secret key, as well as a development secret key as the first secret key, are installed in a system LSI 31 as the first LSI. An ID LSI 32 having a second random number of seed for generation of the mass-production secret key is bonded to the system LSI 31. A random number generation circuit 313 generates a value based on the first and second random number of seed, and the generated value is used as the mass-production secret key.

More specifically, as shown in FIG. 8, in the system LSI 31, a ROM 311 as a memory part stores the development secret key and the first random number of seed, and outputs either one of them according to a signal input at a pad 312 as the first external input terminal. The random number generation circuit 313 generates the mass-production secret key based on the first random number of seed output from the ROM 311 and the second random number of seed input at pads 314 as the second external input terminal. A selector 316 selects and outputs either one of the output of the ROM 311 and the output of the random number generation circuit 313 according to a signal input at a pad 315 as the third external input terminal. A verification section 317 as a processing circuit uses the output of the selector 316 as the secret key.

The ROM 311 outputs the development secret key when the input signal at the pad 312 is "H", and outputs the first random number of seed when the input signal is "L". The selector 316 outputs the output of the ROM 311 when the input signal at the pad 315 is "H", and outputs the output of the random number generation circuit 313 when the input signal is "L". Before the bonding of the ID LSI 32, both the pads 312 and 315 are in an internally pulled-up state, to allow the output of the ROM 311, that is, the development secret key to be output from the selector 316.

The ID LSI 32 includes a memory part 321 storing the second random number of seed, pads 322 as the first external output terminal connected to the ground GND, pads 323 as the second external terminal for outputting the second random number of seed stored in the memory part 321, and pads 324 as the third external output terminal connected to the ground GND.

The ID LSI 32 is bonded to the system LSI 31 so that the pads 322, 323 and 324 of the ID LSI 32 are connected to the pads 312, 314 and 315 of the system LSI 31, respectively. By this connection, the signal of "L" is applied to both the pads 312 and 315 of the system LSI 31. Thus, the mass-production secret key, generated by the random number generation circuit 313 based on the first random number of seed stored in the ROM 311 and the second random number of seed supplied to the pads 314, is input into the verification section 317 via the selector 316.

In this embodiment, the ID LSI 32 in which the second random number of seed has been installed is bonded to the system LSI 31. This makes it extremely difficult to monitor the mass-production secret key from outside the LSI, and thus improves the concealment of the mass-production secret key.

In addition, in this embodiment, the value of the mass-production secret key can be changed by changing the position of bonding of the ID LSI 32 to the system LSI 31.

As shown in FIG. 8, the pads 314 include a plurality of terminals such as three terminals as illustrated. The three terminals are connected to the random number generation circuit 313 via different input lines 318a, 318b and 318c. The random number generation circuit 313 generates a random number with a type of logic unique to each of the input lines 318a, 318b and 318c via which the signal is input. Also, the pads 323 of the ID LSI 32 for outputting the second random number of seed are arranged in three rows and three columns. Each column of the pads 323 corresponds to each terminal of the pads 314 of the system LSI 31.

Figure 9A:
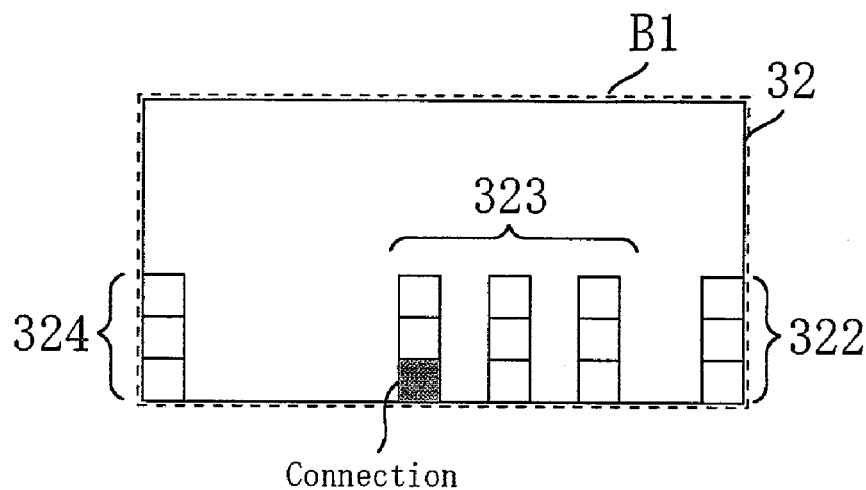
FIGS. 9(*a*) to 9(*c*) illustrate the relationship between the position of bonding of an ID LSI and the pad via which a second random number of seed is input.
Figure 9B:
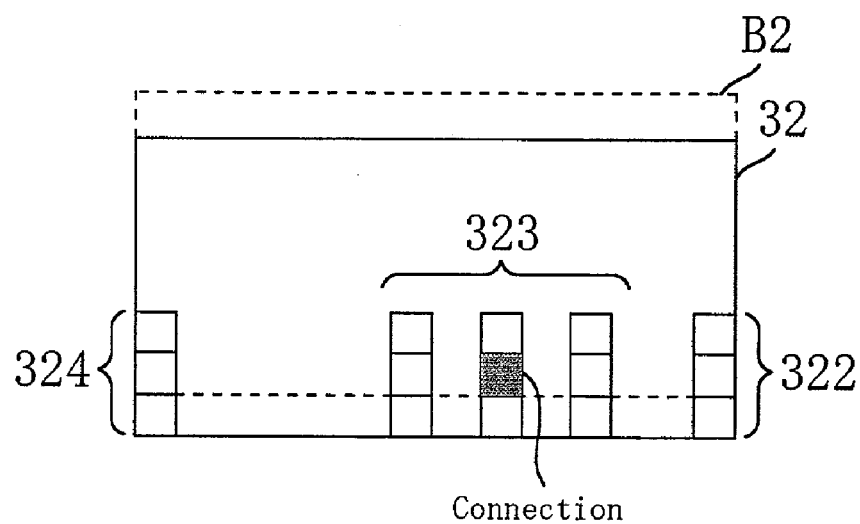
Figure 9C:
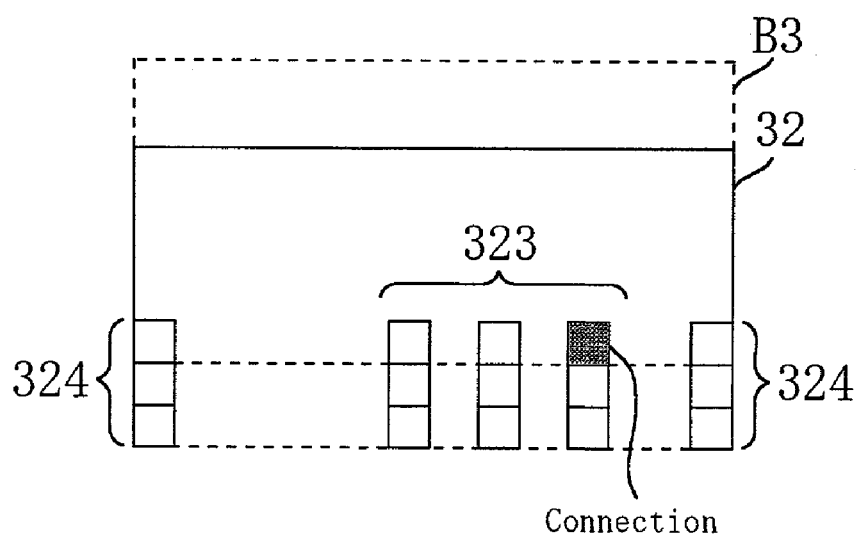

FIG. 9 illustrates the relationship between the connection between the pads 314 of the system LSI 31 and the pads 323 of the ID LSI 32 and the bonding position. In FIG. 9, the dashed-line rectangles B1, B2 and B3 shown relative to the ID LSI 32 correspond to the dashed-line rectangle A of the system LSI 31 shown in FIG. 8. That is, when the position in FIG. 9(a) is regarded as the reference, the ID LSI 32 is bonded in a position displaced downward by one pad in FIG. 9(b), and bonded in a position displaced downward by two pads in FIG. 9(c).

In the bonding shown in FIG. 9(a) in which the bottom row of the pads 323 of the ID LSI 32 are aligned with the pads 314 of the system LSI 31, the second random number of seed is input into the random number generation circuit 313 via the input line 318a. Likewise, in the bonding shown in FIG. 9(b) in which the second row of the pads 323 are aligned with the pads 314 of the system LSI 31, the second random number of seed is input into the random number generation circuit 313 via the input line 318b. In the bonding shown in FIG. 9(c) in which the top row of the pads 323 are aligned with the pads 314 of the system LSI 31, the second random number of seed is input into the random number generation circuit 313 via the input line 318c.

As described above, the input line via which the second random number of seed is input into the random number generation circuit 313 can be changed by changing the position of the bonding of the ID LSI 32. Therefore, the output of the random number generation circuit 313, that is, the value of the mass-production secret key can be changed with the position of the bonding of the ID LSI 32.

Fourth Embodiment

Figure 11:
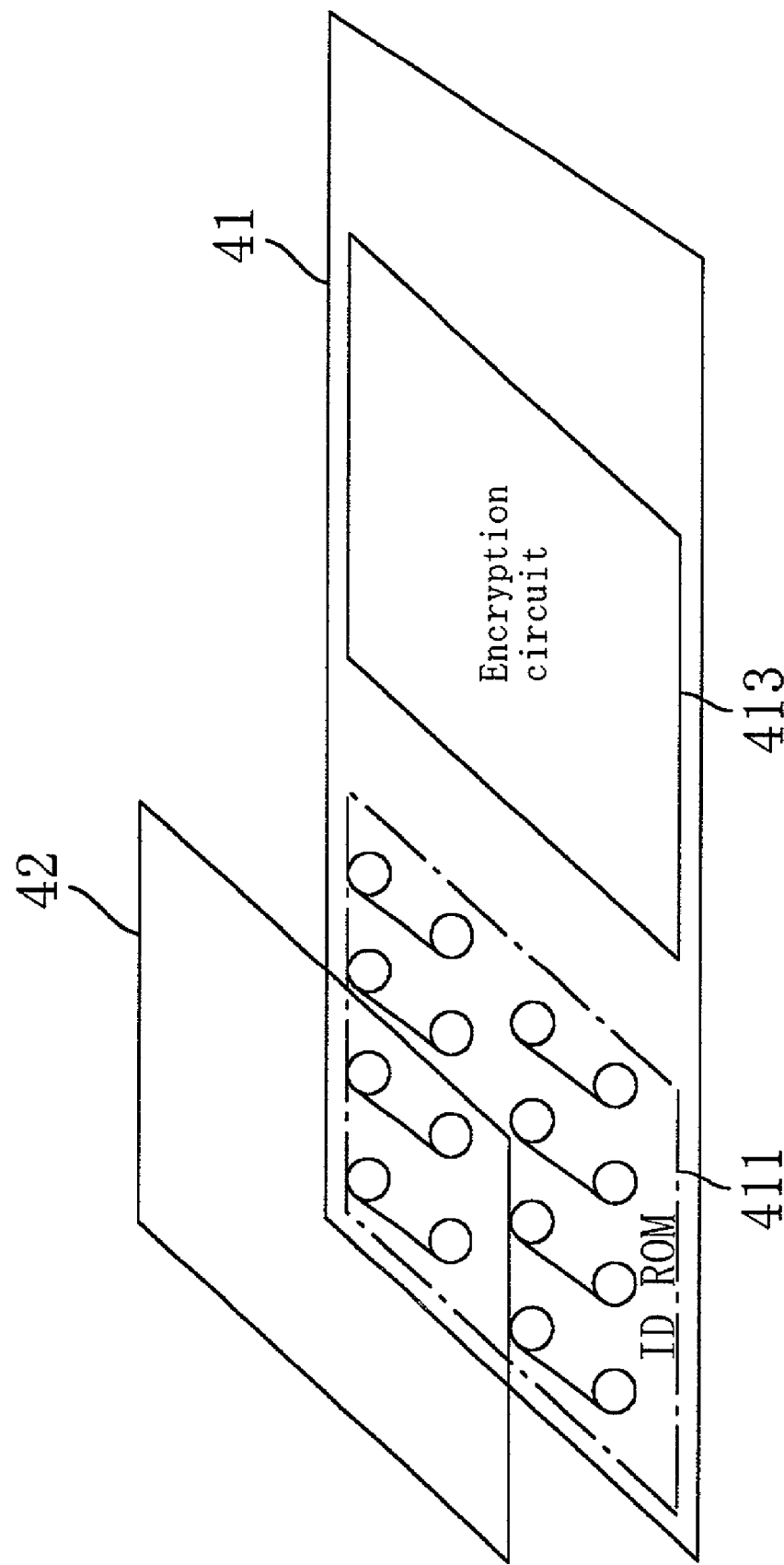
FIG. 11 illustrates the result of execution of the fourth embodiment.

FIGS. 10 and 11 illustrate a secret key installation method of the fourth embodiment of the present invention. As shown in FIG. 10(a), an encryption LSI 41 as the first LSI includes a circuit 411 of a ROM structure and an encryption circuit 413 receiving an ID value output from the circuit 411. The circuit 411 outputs the ID value according to the power supplied (VDD or VSS) at pads 412. As shown in FIG. 10(b), an ID LSI 42 as the second LSI includes a plurality of pads 421 each connected to a power supply line VDD or VSS.

First, the positions of the pads of the ID LSI 42 that should be bumped are determined according to the ID to be provided to the encryption LSI 41. Assuming that the ID value is Fh and Ah (h represents the hexadecimal notation), the positions that are not enclosed with a rectangle 422 in FIG. 10(c) are determined as the positions to be bumped.

Thereafter, the determined positions of the ID LSI 42 are bumped, and as shown in FIG. 11, the bumped ID LSI 42 is bonded to the encryption LSI 41. In this way, the power supplied (VDD or VSS) at the bumped positions of the pads 421 is input into the encryption circuit 41 as the ID value.

As described above, in this embodiment, the ID value to be provided to the encryption LSI can be changed only by changing the positions to be bumped in the ID LSI 42.

Fifth Embodiment

Figure 12:
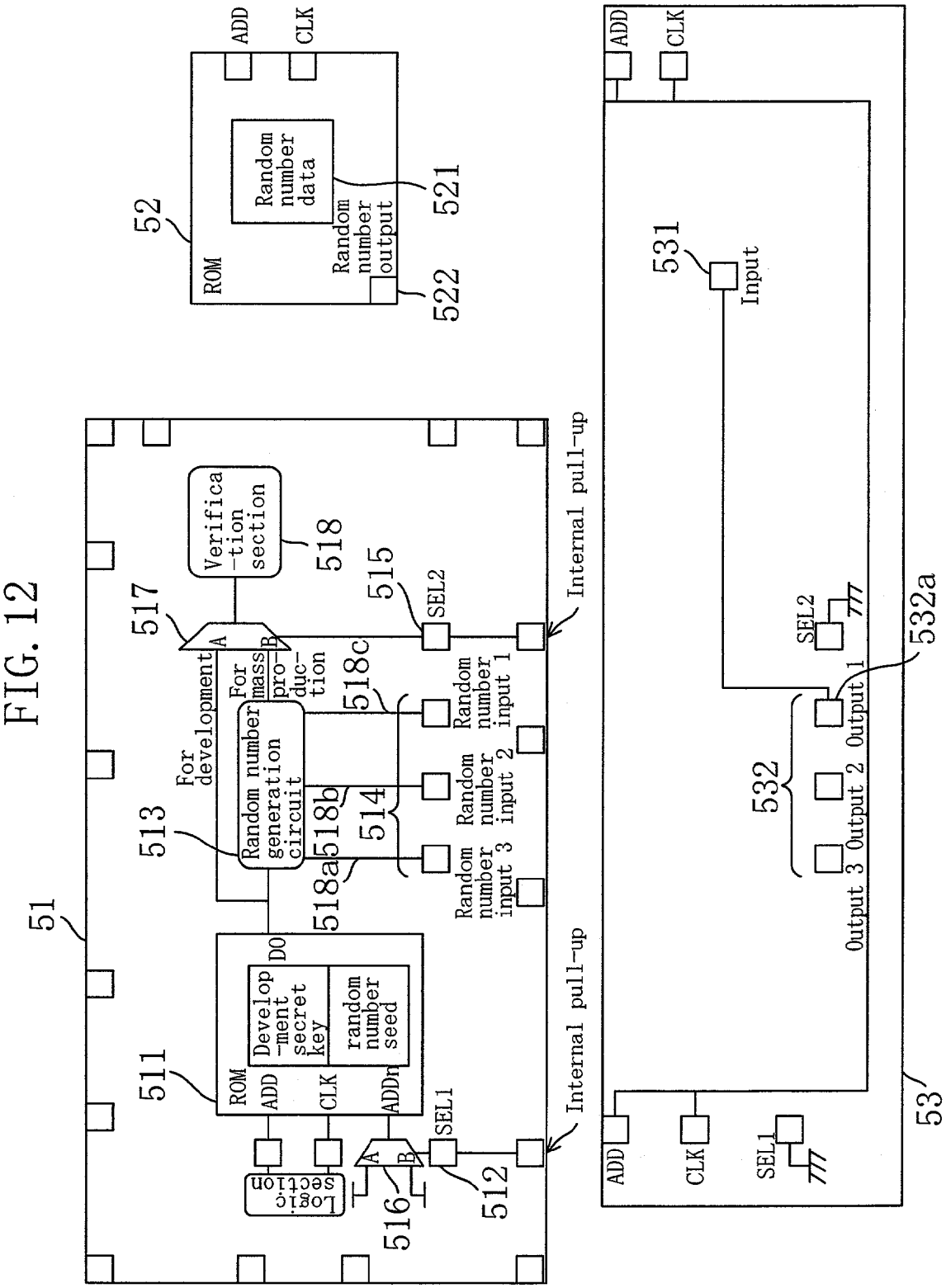
FIG. 12 illustrates a secret key installation method of the fifth embodiment of the present invention.

FIGS. 12 and 13 illustrate a secret key installation method of the fifth embodiment of the present invention. In this embodiment, a system LSI 51 as the first LSI and a random number LSI 52 as the second LSI are bonded to a wiring LSI 53, for installation of a secret key. By selection of a wiring LSI used for the bonding among a plurality of wiring LSIs, the logic for generation of a random number in the system LSI is changed.

As shown in FIG. 12, in the system LSI 51 as the first LSI, a ROM 511 stores a development secret key and a random number of seed, and outputs one of them according to a signal input at a pad 512. More specifically, when a selection signal sel1 input at the pad 512 is "H", a selector 516 outputs input A indicating "H" to thereby fix the most significant bit ADDn of the address of the ROM 511 at "H". Thus, only the address region storing the development secret key is made available. On the contrary, when the selection signal sel1 is "L", the selector 516 outputs input B indicating "L", and thus only the address region storing the random number of seed is made available.

A random number generation circuit 513 generates a random number to be used as a mass-production secret key based on the random number of seed output from the ROM 511 and random number data input via pads 514 as the random number input terminal. A selector 517 selects and outputs either one of the output of the ROM 511 and the output of the random number generation circuit 513. More specifically, the selector 517 outputs input A, that is, the output of the ROM 511 when a selection signal sel2 input at a pad 515 is "H", and outputs input B, that is, the output of the random number generation circuit 513 when the selection signal sel2 is "L". A verification section 518 uses the output of the selector 517 as the secret key.

The pads 512 and 515 are in the internally pulled-up state, and thus both the selection signals sel1 and sel2 are "H", to thereby allow the selector 517 to select and output the development secret key output from the ROM 511.

The random number LSI 52 includes a memory part 521 storing random number data and a pad 522 as the random number output terminal for outputting the random number data stored in the memory part 521.

The wiring LSI 53 includes a pad 531 as the external input terminal and pads 532 as the external output terminal. One of the pads 532, determined according to the type of the wiring LSL is connected with the pad 531. In the wiring LSI 53 shown in FIG. 12, the pad 532a as output 1 is connected with the pad 531.

Figure 13A:
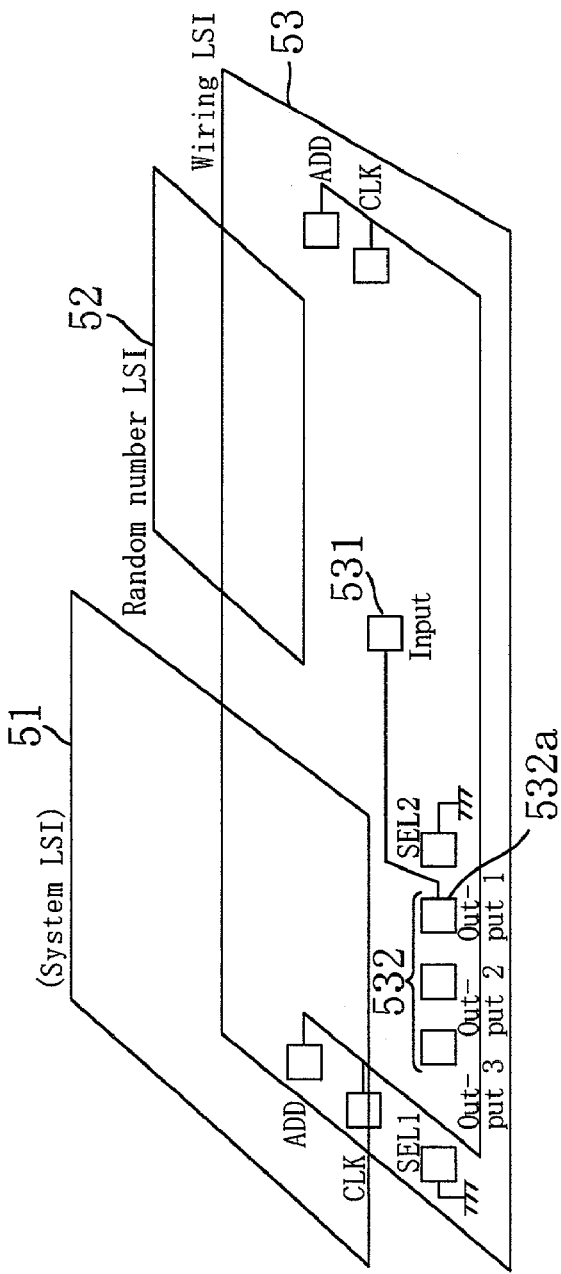
FIG. 13 illustrates the result of execution of the fifth embodiment.

As shown in FIG. 13(a), the system LSI 51 and the random number LSI 52 are bonded to the wiring LSI 53. The bonding is made so that the pads 514 of the system LSI 51 are connected to the pads 532 of the wiring LSI 53 and the pad 522 of the random number LSI 52 is connected to the pad 531 of the wiring LSI 53. Also, during the bonding, the pads 512 and 515 of the system LSI 51 are connected to the ground GND.

As a result of the bonding, the random number data stored in the memory part 521 of the random number LSI 52 is input into the random number generation circuit 513 of the system LSI 51 via the wiring LSI 53 and the input line 518c. The random number generation circuit 513 generates a random number to be used as the mass-production secret key based on the random number of seed stored in the ROM 511 and the random number data received via the wiring LSI 53 with the logic unique to the input line 518c. The generated mass-production secret key is supplied to the verification section 518 via the selector 517.

Figure 13B:
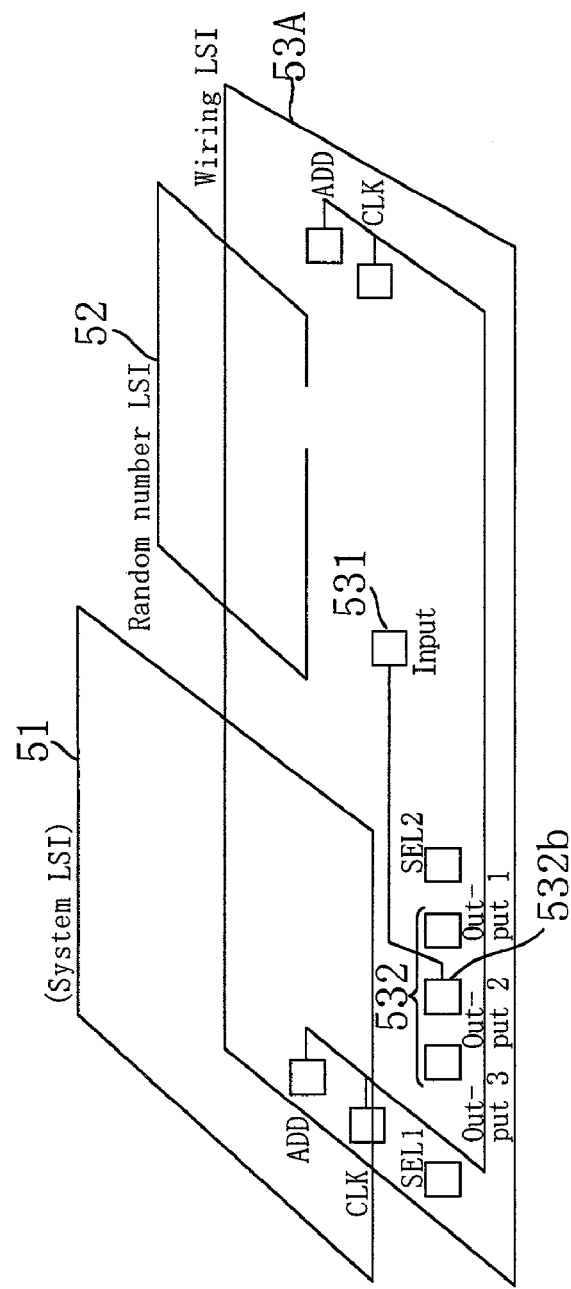

When a wiring LSI 53A shown in FIG. 13(b) in which the pad 531 is connected with the pad 532b is selected, the random number data stored in the memory part 521 of the random number LSI 52 is input into the random number generation circuit 513 of the system LSI 51 via the wiring LSI 53A and the input line 518b. Thus, the random number generation circuit 513 generates a random number to be used as the mass-production secret key based on the random number of seed stored in the ROM 511 and the random number data received via the wiring LSI 53A with the logic unique to the input line 518b.

As described above, in this embodiment, the input line via which the random number data is input into the random number generation circuit can be changed by changing the type of the wiring LSI, and thus the mass-production secret key can be generated with a different type of logic.

Sixth Embodiment

The sixth embodiment of the present invention relates to testing of an LSI having a memory part from which an ID value is output according to an address supplied, using an LSI for a tester.

FIG. 14 illustrates an LSI test method of this embodiment. In FIG. 14(a), an LSI 61 includes a ROM 611 as a memory part, a first test circuit 612, a comparator 613 for comparing the output of the ROM 611 with the output of the first test circuit 612, and a verification section 614 for processing using the ID value output from the ROM 611. The ROM 611 stores a plurality of ID values and outputs one of the ID values according to an address supplied.

A tester LSI 62 includes a second test circuit 621, which is configured to provide the same function as that of the ROM 611 together with the first test circuit 612 of the LSI 61 when they are in connection with each other. In other words, when the first test circuit 612 receives the same address as that supplied to the memory part 611 in the state of being connected with the second test circuit 621, the first test circuit 612 outputs the same value as that output from the ROM 611. FIG. 14(b) is an example of the relationship among the address, the output of the ROM 611 and the output obtained when the first and second test circuits 612 and 621 are in connection with each other.

In the testing process of the LSI 61, the second test circuit 621 of the tester LSI 62 is connected to the first test circuit 612 of the LSI 61. In this state, various address values are supplied, to compare the output of the ROM 611 with the output of the first and second test circuits 612 and 621 connected together.

Figures 15A, 15B:
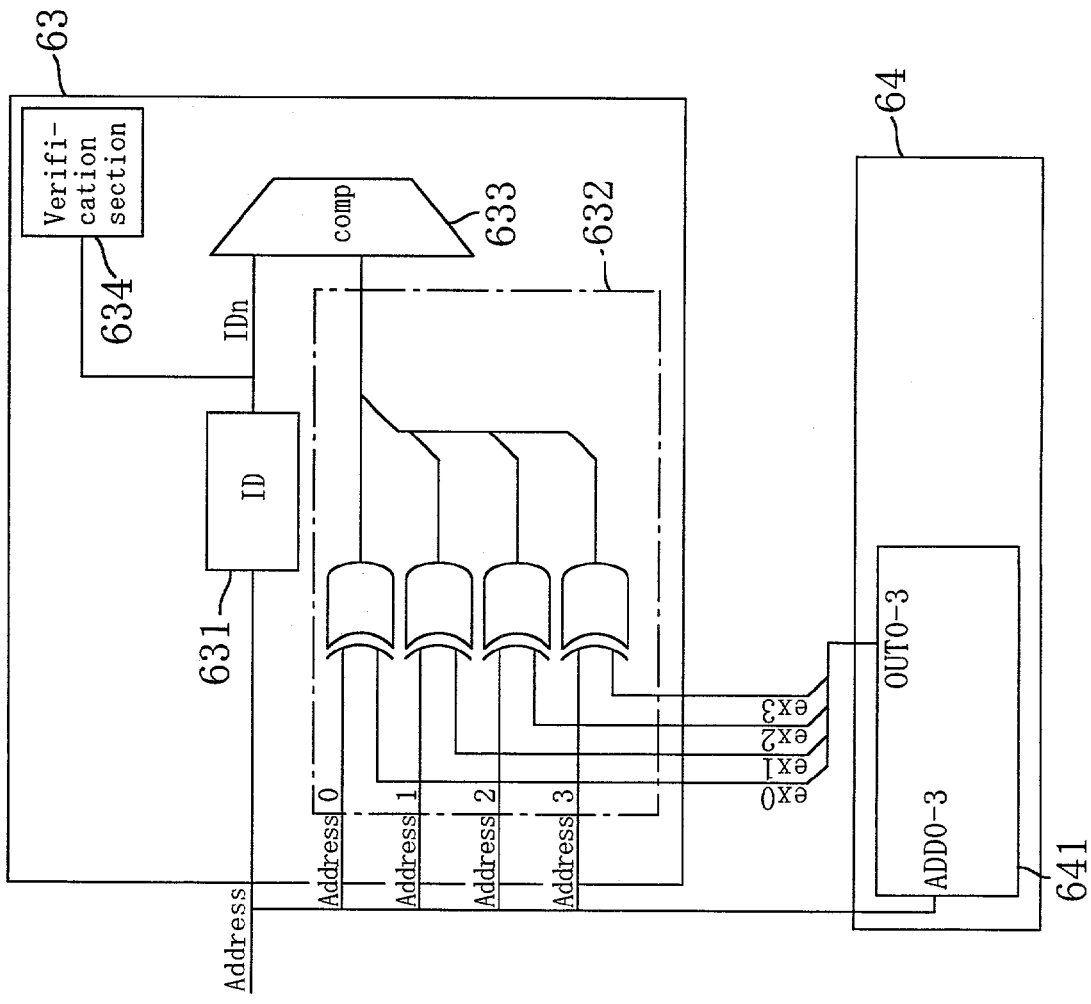
FIG. 15 illustrates another LSI test method of the sixth embodiment of the present invention.
Figure 16:
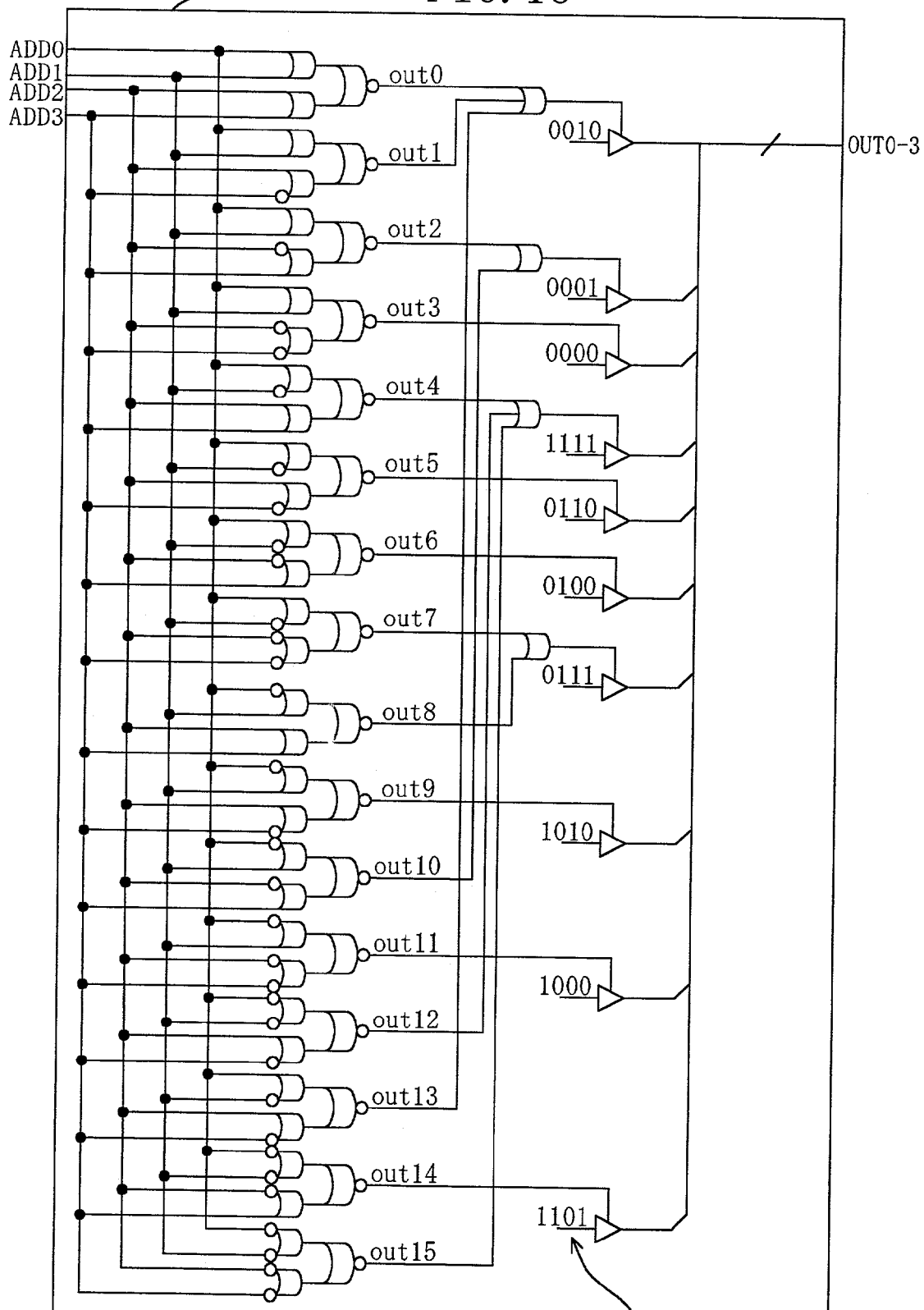
FIG. 16 illustrates a specific example of configuration of a tester LSI.

FIGS. 15 and 16 illustrate another example of this embodiment. In FIG. 15(a), an LSI 63 includes a ROM 631 as a memory part, a first test circuit 632, a comparator 633 for comparing the output of the ROM 631 with the output of the first test circuit 632, and a verification section 634 for processing using the ID value output from the ROM 631. The ROM 631 stores a plurality of ID values and outputs one of the ID values according to an address supplied.

A tester LSI 64 includes a second test circuit 641, which is configured to provide the same function as that of the ROM 631 together with the first test circuit 632 of the LSI 63 when they are in connection with each other. FIG. 16 illustrates a specific example of configuration of the test circuit 641. When the first and second test circuits 632 and 641 receive the same address as that supplied to the memory part 631 in the state of connection with each other, the first test circuit 632 outputs the same value as that output from the ROM 631. FIG. 15(b) is an example of the relationship among the address, the output of the ROM 631 and the output obtained when the first and second test circuits 632 and 641 are in connection with each other.

In the testing process of the LSI 63, the second test circuit 641 of the tester LSI 64 is connected to the first test circuit 632 of the LSI 63. In this state, various address values are supplied, to compare the output of the ROM 631 with the output of the first and second test circuits 632 and 641 connected together.

Seventh Embodiment

The seventh embodiment of the present invention relates to a development method of an encryption ID LSI obtained by bonding an encryption LSI and an ID LSI together.

Figure 17A:
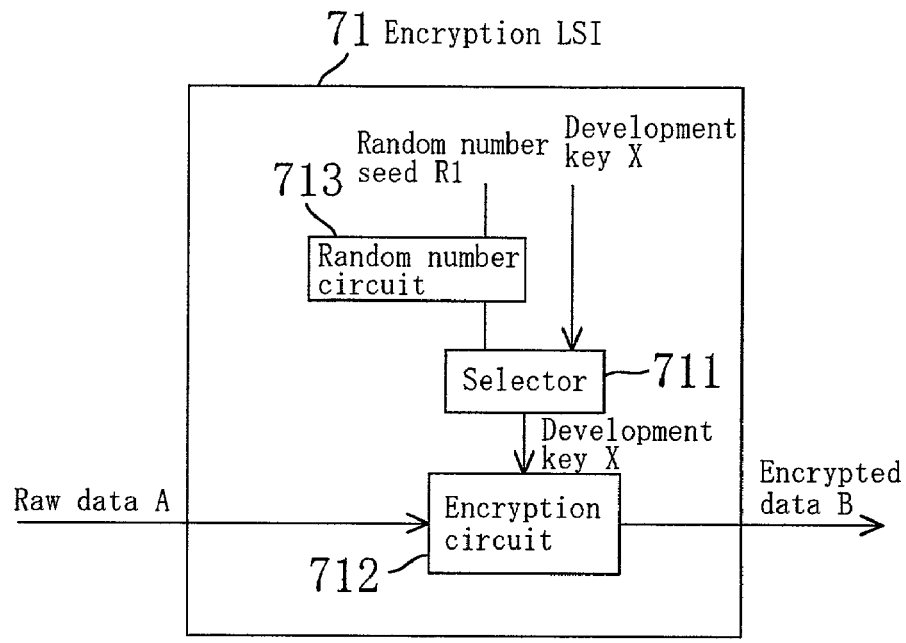
FIG. 17 illustrates an encryption ID LSI of the seventh embodiment of the present invention.
Figure 17B:
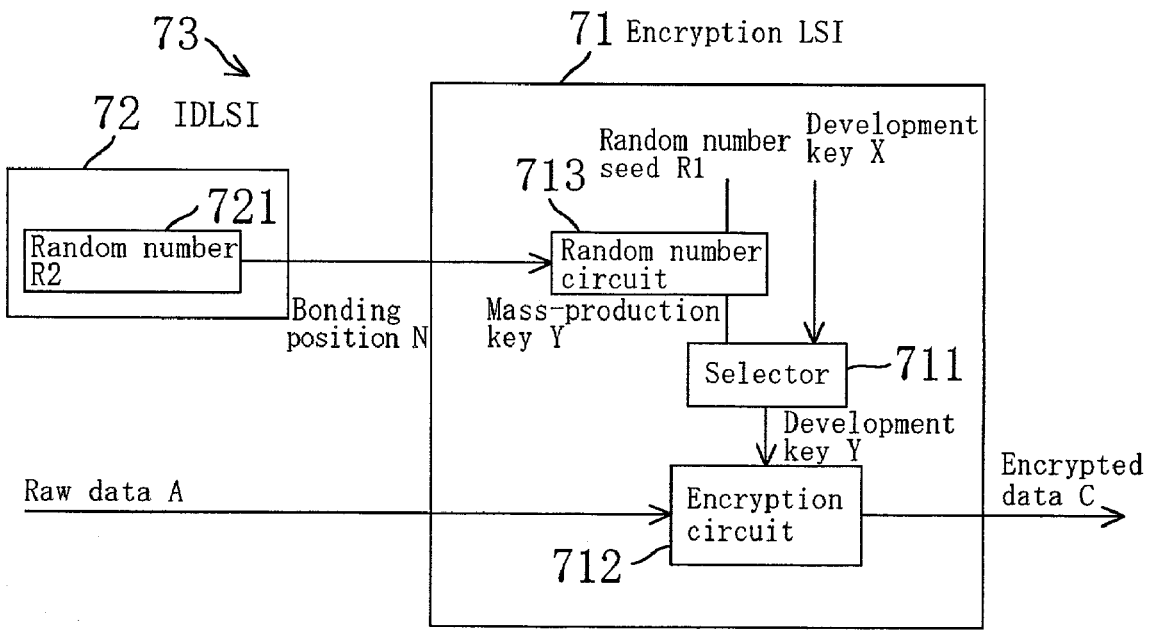

FIG. 17 illustrates an encryption ID LSI of this embodiment. As shown in FIG. 17 (a), in an encryption LSI 71 as the first LSI, a development key X is selected by a selector 711 and input into an encryption circuit 712. When raw data A is input into the encryption circuit 712 externally, encrypted data B encrypted with the development key X is output. An ID LSI 72 as the second LSI is bonded to the encryption LSI 71 as shown in FIG. 17 (b), to obtain an encryption ID LSI 73. The ID LSI 72 includes a memory part 721 storing a random number R2. A random number circuit 713 of the encryption LSI 71 generates a mass-production key Y based on a random number of seed R1 and the random number R2. The mass-production key Y generated by the random number circuit 713 varies depending on the position N of the bonding of the ID LSI 72. The mass-production key Y is selected by the selector 711 and input into the encryption circuit 712. When the raw data A is input into the encryption circuit 712 externally, encrypted data C encrypted with the mass-production key Y is output.

Figure 18:
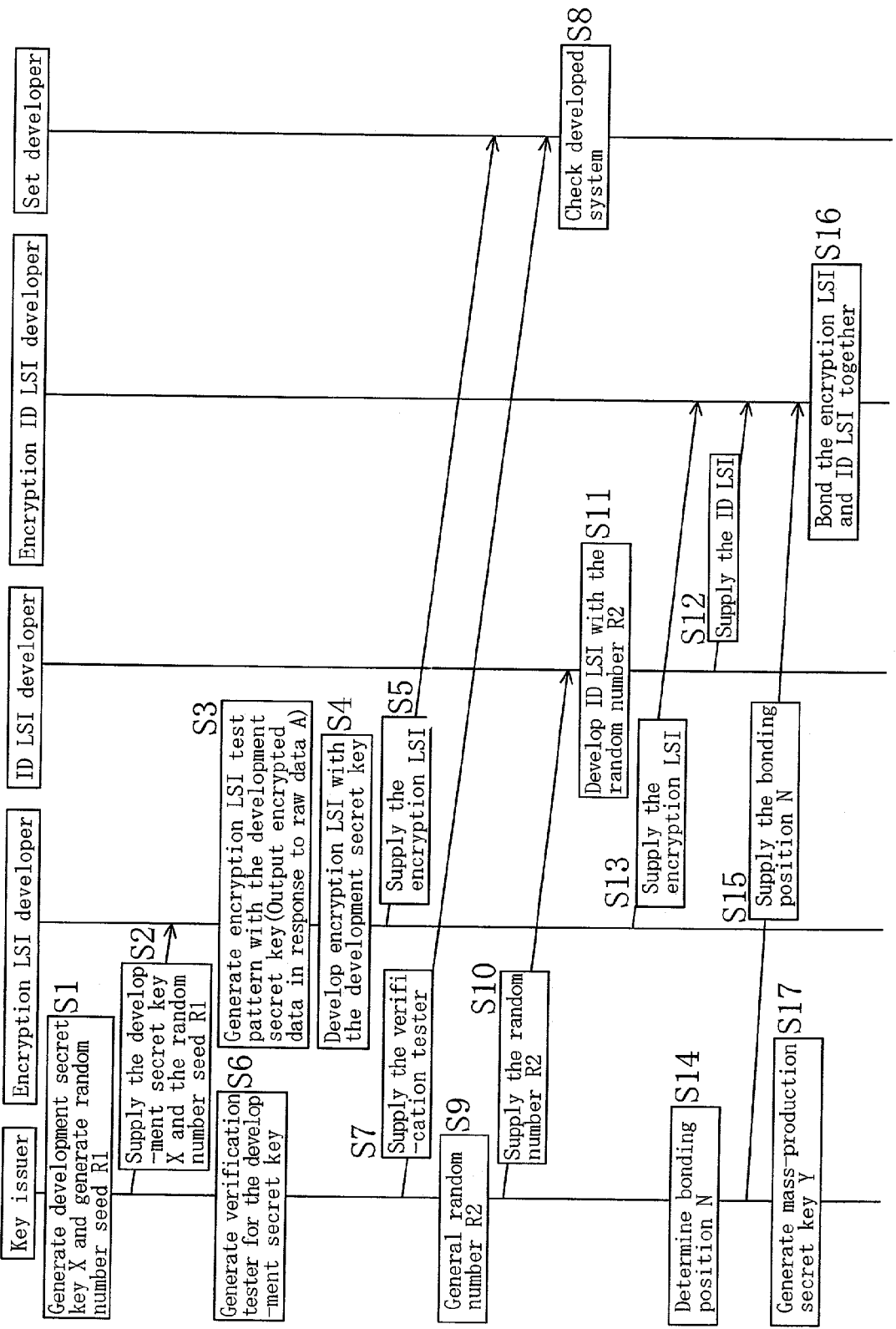
FIG. 18 is a flowchart of a development method of the encryption ID LSI shown in FIG. 17.

FIGS. 18 and 19 show a flowchart of the development method of the encryption ID LSI 73 shown in FIG. 17. First, referring to FIG. 18, a key publisher generates the development secret key X and the random number of seed R1 (S1), and supplies them to an encryption LSI developer as the first developer (S2). The encryption LSI developer generates an encryption LSI test pattern with the development secret key X (S3), or to state differently, allows output of the encrypted data B in response to the raw data A. The encryption LSI developer then develops the encryption LSI 71 using the supplied development secret key X (S4), and supplies the developed encryption LSI 71 to the set developer (S5). The key publisher also generates a verification tester adapted to the development secret key X (S6), and supplies the verification tester to the set developer (S7). The set developer checks the developed system (S8).

The key publisher then generates the random number R2 (S9), and supplies the random number R2 to an ID LSI developer as the second developer (S10). The ID LSI developer develops the ID LSI 72 using the supplied random number R2 (S11) and supplies the ID LSI 72 to an encryption ID LSI producer (S12). Also, the encryption LSI developer supplies the developed encryption LSI 71 to the encryption LSI producer (S13).

The key publisher determines the bonding position N (S14), and supplies the bonding position N to the encryption ID LSI producer (S15). The encryption ID LSI producer bonds the encryption LSI 71 and the ID LSI 72 together according to the supplied bonding position N, to thereby complete development of the encryption ID LSI 73 (S16). The key publisher generates the mass-production secret key Y based on the random number of seed R1, the random number R2 and the bonding position N. Any person other than the key publisher is kept from knowing this mass-production secret key Y.

Subsequently, referring to FIG. 19, the encryption ID LSI producer checks the bonded state of the encryption ID LSI 73 (S18), and delivers a sample Z of the encryption ID LSI 73 to the set developer (S19). The key publisher generates a verification tester adapted to the mass-production secret key Y (S19), and supplies the verification tester to the set developer (S21). The set developer checks the developed system (S22). After acceptance of the operation, the set developer returns the sample Z to the encryption ID LSI producer (S23). The encryption ID LSI producer produces a test pattern using the returned sample Z as the reference chip (S24). That is, raw data A is input into the sample Z and the resultant encrypted data C is used as the input/output test pattern.

The encryption ID LSI producer mass-produces the encryption ID LSI 73 (S25), conducts shipment inspection for the products using the test pattern (S26), and ships the products to the set developer (S27).

By employing the development method described above, the encryption ID LSI can be developed without the possibility that a person other than the key publisher may come to know the value of the mass-production secret key during the development.

As described above, according to the present invention, ID-installed LSIs can be mass-produced. Also, the concealment of the secret key improves, and the setting of the ID value and the value of the secret key is facilitated. Moreover, the ID value installed in the LSI can be tested without increase of the circuit scale. Furthermore, the concealment of the secret key in the development process enhances.

What is claimed is:

1. A method for installing a secret key in a Large Scale Integration device, comprising a step of bonding a second Large Scale Integration device to a first Large Scale Integration device, wherein the first Large Scale Integration device comprises:
a memory part for storing a first secret key;
first and second external input terminals;
a selector having an input for receiving the first secret key and other input connected with the first external input terminal, the selector having a selection signal input connected with the second external input terminal; and
a processing circuit using an output of the selector as the secret key, the second Large Scale Integration device comprises:
a memory part for storing a second secret key;
first external output terminal from which the second secret key is output; and
a second external output terminal from which a selection signal is output, the selection signal being set so that the selector of the first Large Scale Integration device selects and outputs the other input, and
the step of bonding comprises bonding the second Large Scale Integration device to the first Large Scale Integration device so that the first and second external output terminals of the second Large Scale Integration device are connected to the first and second external input terminals of the first Large Scale Integration device, respectively.

2. A method for installing a secret key in a Large Scale Integration device, comprising a step of bonding a second Large Scale Integration device to a first Large Scale Integration device,
wherein the first Large Scale Integration device comprises:
first, second and third external input terminals;
a memory part for storing a first secret key and a first random number of seed and outputting either the first secret key or the first random number of seed according to a signal input at the first external input terminal;
a random number generation circuit for receiving the output of the memory part and a signal input at the second external input terminal;
a selector for receiving the output of the memory part and an output of the random number generation circuit as inputs and selecting and outputting either one of the inputs according to a signal input at the third external input terminal; and
a processing circuit using the output of the selector as the secret key,
the second Large Scale Integration device comprises:
a memory part for storing a second random number of seed;
a first external output terminal from which a selection signal is output, the selection signal being set so that the memory part of the first Large Scale Integration device outputs the first random number of seed;
a second external output terminal from which the second random number of seed is output; and
a third external output terminal from which a selection signal is output, the selection signal being set so that the selector of the first Large Scale Integration device selects and outputs the output of the random number generation circuit, and
the step of bonding comprises bonding the second Large Scale Integration device to the first Large Scale Integration device so that the first, second and third external output terminals of the second Large Scale Integration device are connected to the first, second and third external input terminals of the first Large Scale Integration device, respectively.

3. The method of claim 2, wherein the second external input terminal of the first Large Scale Integration device is composed of a plurality of terminals, the terminals being connected to the random number generation circuit via different input lines, the random number generation circuit generates a random number with a type of logic unique to the input line via which the signal is input, and the second external output terminal of the second Large Scale Integration device is configured so that the input line via which the second random number of seed is input into the random number generation circuit varies depending on a position of bonding of the second Large Scale Integration device to the first Large Scale Integration device.

4. A method for installing a secret key in a Large Scale Integration device, comprising:

a first step of selecting one wiring Large Scale Integration device among a plurality of types of wiring Large Scale Integration devices; and a second step of bonding a first Large Scale Integration device and a second Large Scale Integration device to the wiring Large Scale Integration device selected in the first step, wherein the wiring Large Scale Integration device includes one external input terminal and a plurality of external output terminals, one of the plurality of external output terminals determined according to the type of the wiring Large Scale Integration device being connected with the external input terminal, the first Large Scale Integration device comprising:

a plurality of random number input terminals; and a random number generation circuit connected with the random number input terminals via different input lines for generating a random number to be used as the secret key based on random number data input via one of the input lines with a type of logic unique to the one of the input lines, the second Large Scale Integration device comprises:

a memory part for storing random number data; and a random number output terminal for outputting the random number data stored in the memory part, and the second step comprises bonding the first Large Scale Integration device to the selected wiring so that the random number input terminals of the first Large Scale Integration device are connected to the corresponding external output terminals of the wiring Large Scale Integration device, and bonding the second Large Scale Integration device to the wiring Large Scale Integration device so that the random number output terminal of the second Large Scale Integration device is connected to the external input terminal of the wiring Large Scale Integration device.

5. A Large Scale Integration device development method comprising the steps of:

a key publisher generating a development secret key and a random number of seed and supplying the development secret key and the random number of seed to a first developer;

the first developer developing a first Large Scale Integration device using the development secret key and the random number of seed;

the key publisher generating a random number and supplying the random number to a second developer;

the second developer developing a second Large Scale Integration device using the random number;

the first developer supplying the developed first Large Scale Integration device to a producer;

the second developer supplying the developed second Large Scale Integration device to the producer;

the key publisher determining a position in which the first Large Scale Integration device and the second Large Scale Integration device are bonded together and supplying the position to the producer; and the producer bonding the first Large Scale Integration device and the second Large Scale Integration device together according to the position of bonding supplied from the key publisher.

* * * * *